United States Patent
Akef et al.

(10) Patent No.: US 10,250,556 B2
(45) Date of Patent: *Apr. 2, 2019

(54) SYSTEMS AND METHODS FOR ALLOCATING COMMUNICATION RESOURCES VIA INFORMATION TECHNOLOGY INFRASTRUCTURE

(71) Applicant: Google LLC, Mountain View, CA (US)

(72) Inventors: Ahmed Mohamed Hassan Osman Akef, San Jose, CA (US); Anshul Kothari, Sunnyvale, CA (US); Daniel Andersson, Mountain View, CA (US); Amit Agarwal, Mountain View, CA (US); Anshul Kundani, Yorba Linda, CA (US); Narendra Kumar Singhal, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,447

(22) Filed: Apr. 27, 2018

(65) Prior Publication Data

US 2018/0248843 A1    Aug. 30, 2018

Related U.S. Application Data

(63) Continuation of application No. 15/015,983, filed on Feb. 4, 2016, now Pat. No. 9,967,230.

(51) Int. Cl.
*G06F 15/16* (2006.01)
*H04L 29/12* (2006.01)
*H04L 29/08* (2006.01)

(52) U.S. Cl.
CPC .......... *H04L 61/2076* (2013.01); *H04L 67/02* (2013.01); *H04L 61/605* (2013.01)

(58) Field of Classification Search
CPC .... H04L 61/2076; H04L 67/02; H04L 61/605
See application file for complete search history.

(56) References Cited

U.S. PATENT DOCUMENTS

| 6,999,444 B1 | 2/2006 | Nitta et al. |
| 7,386,111 B2 | 6/2008 | Holder |

(Continued)

FOREIGN PATENT DOCUMENTS

| EP | 2 587 437 A1 | 5/2013 |
| GB | 2 479 209 A | 10/2011 |

OTHER PUBLICATIONS

International Search Report and Written Opinion for Application No. PCT/US2016/069613, dated Apr. 6, 2017.

(Continued)

*Primary Examiner* — Padma Mundur
(74) *Attorney, Agent, or Firm* — Foley & Lardner LLP

(57) ABSTRACT

The present disclosure is directed to allocating communication resources via information technology infrastructure. A system can provide a communication tag and an analytics tag for integration in a web site. The system can receive a request to allocate a phone number generated based on an interaction between the communication tag and the analytics tag. The request can include the communication endpoint identifier, the site identifier for the web site, and a bucket identifier formed from bucketing criteria corresponding to a network activity session of the computing device. The system can determine a virtual phone number to assign to a combination of the values of the fields provided in the request, and create a link between the assigned virtual number and the combination. The system can provide the assigned virtual phone number to the computing device that initiated the request.

20 Claims, 5 Drawing Sheets

(56) References Cited

U.S. PATENT DOCUMENTS

| | | | |
|---|---|---|---|
| 7,644,121 | B2 | 1/2010 | Swanson et al. |
| 7,711,598 | B2 | 5/2010 | Perkowski |
| 8,037,512 | B2 | 10/2011 | Wright et al. |
| 8,483,371 | B2 | 7/2013 | Crandell et al. |
| 8,498,405 | B2 | 7/2013 | Siegrist |
| 8,509,391 | B2 | 8/2013 | Elliot et al. |
| 8,619,576 | B2 | 12/2013 | Vasseur et al. |
| 8,732,322 | B1 | 5/2014 | Agrawal et al. |
| 8,817,957 | B1 | 8/2014 | Tirey et al. |
| 9,047,473 | B2 | 6/2015 | Samuelsson et al. |
| 9,141,970 | B2 * | 9/2015 | Fisher ................. H04M 3/2218 |
| 2002/0046279 | A1 | 4/2002 | Chung |
| 2003/0004802 | A1 | 1/2003 | Callegari |
| 2003/0046334 | A1 | 3/2003 | Simpson |
| 2003/0140091 | A1 | 7/2003 | Himmel et al. |
| 2004/0128534 | A1 | 7/2004 | Walker |
| 2004/0243939 | A1 | 12/2004 | Perepa et al. |
| 2005/0273842 | A1 | 12/2005 | Wright et al. |
| 2006/0067484 | A1 | 3/2006 | Elliot et al. |
| 2007/0297579 | A1 | 12/2007 | Tannenbaum |
| 2008/0097845 | A1 | 4/2008 | Altberg et al. |
| 2008/0142586 | A1 | 6/2008 | Hugot et al. |
| 2008/0267377 | A1 * | 10/2008 | Siegrist ................. H04M 7/003 379/201.02 |
| 2009/0138262 | A1 | 5/2009 | Agarwal et al. |
| 2009/0238348 | A1 | 9/2009 | Agarwal et al. |
| 2010/0281008 | A1 | 11/2010 | Braunwarth |
| 2011/0163848 | A1 | 7/2011 | Shibata |
| 2011/0166938 | A1 | 7/2011 | Deridder et al. |
| 2011/0238766 | A1 | 9/2011 | Lew et al. |
| 2011/0316672 | A1 | 12/2011 | Burris et al. |
| 2012/0004981 | A1 * | 1/2012 | Bhatia ................. G06Q 30/02 705/14.42 |
| 2012/0165014 | A1 | 6/2012 | Ishihara |
| 2012/0269333 | A1 | 10/2012 | Goguen et al. |
| 2013/0030986 | A1 | 1/2013 | Agarwal et al. |
| 2013/0054247 | A1 | 2/2013 | Rajput et al. |
| 2013/0102274 | A1 * | 4/2013 | Lauwaert ........... G06Q 30/0242 455/405 |
| 2013/0115921 | A1 | 5/2013 | Szesztay et al. |
| 2015/0066633 | A1 * | 3/2015 | Agrawal ............ G06Q 30/0246 705/14.45 |
| 2015/0222481 | A1 | 8/2015 | Smits et al. |
| 2015/0271670 | A1 | 9/2015 | Johnston et al. |
| 2015/0379562 | A1 | 12/2015 | Spievak et al. |
| 2016/0021091 | A1 | 1/2016 | Hoyer et al. |
| 2016/0066164 | A1 | 3/2016 | Steinbach et al. |
| 2016/0210649 | A1 | 7/2016 | Buckholdt et al. |
| 2017/0104713 | A1 | 4/2017 | Agarwal et al. |
| 2017/0104874 | A1 | 4/2017 | Yi et al. |

OTHER PUBLICATIONS

Kumar et al. "VoiServ: Creation and Delivery of Converged Services through Voice for Emerging Economics", 2007, 8 pages.

Kumar et al. WWTW: The World Wide Telecom Web:, 2007, 6 pages.

U.S. Notice of Allowance on U.S. Appl. No. 15/015,983 dated Jan. 9, 2018.

U.S. Notice of Allowance on U.S. Appl. No. 15/085,624 dated Mar. 19, 2018.

U.S. Office Action on U.S. Appl. No. 15/015,983 dated Sep. 21, 2017.

U.S. Office Action on U.S. Appl. No. 15/016,639 dated Jan. 19, 2018.

U.S. Office Action on U.S. Appl. No. 15/085,624 dated Nov. 17, 2017.

Notice of Allowance on U.S. Appl. No. 15/085,624 dated Jun. 5, 2018.

International Preliminary Report on Patentability, dated Aug. 16, 2018, issued in International Appln. No. PCT/US2016/069613.

TechTarget, "Virtual Phone Number", 2018.

U.S. Non-Final Office Action, dated Jul. 23, 2018, issued in U.S. Appl. No. 15/016,639.

U.S. Notice of Allowance, dated Sep. 20, 2018, issued in U.S. Appl. No. 15/085,624.

\* cited by examiner

SYSTEMS AND METHODS FOR ALLOCATING COMMUNICATION RESOURCES VIA INFORMATION TECHNOLOGY INFRASTRUCTURE

CROSS-REFERENCES TO RELATED APPLICATIONS

This application claims the benefit of priority under 35 U.S.C. § 120 as a continuation of U.S. patent application Ser. No. 15/015,983, filed Feb. 4, 2016, which is hereby incorporated by reference herein in its entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

Systems and methods of the present disclosure are directed to a data processing system that allocates communication resources via information technology infrastructure. The data processing system can be configured to route telecommunications using virtual numbers. For example, users of computing devices can interact with content on a website and then initiate a communication channel using the number provided by the website to contact a content provider (e.g., an advertiser) or other provider of goods or services associated with the website. Advertisers may process data of the computing session (e.g., network activity session) to determine data or network interactions that led to the initiation of the communication channel or a conversion (e.g., purchase of goods or services during a phone call). However, it may be challenging for a data processing system to identify network activity or network activity sessions that led to a phone call or a conversion. A data processing system may identify these calls or conversions by assigning a unique phone number per session so a call can be tied back to the network activity session. Because an advertiser can have tens of thousands of sessions going on in parallel and not all of the sessions are going to lead to a call, and phone numbers are limited resources, it may be challenging to assign a unique number on a per session basis in a scale-able manner. It may be challenging due to the limited number of available numbers to which a data processing system has access.

The present technical solution provides systems and methods that allow for scalable tracking for phone calls originated from a website. The technical solution can include configuring a website with one or more tags, such as java script tags. In some cases, two tags can interact with one another to generate a request for an allocated phone number (e.g., a unique virtual phone number allocated for this user session). The first tag can be a communication tag and the second tag can be an analytics tag. The communication tag can be preconfigured with a target phone number (e.g., the endpoint phone number of the advertiser). The communication tag can also be preconfigured with a site identifier, such as a unique identifier of the website a server generates by combining the website providers account identifier and a log identifier. The analytics tag can be configured to determine information related to network activity and generate a bucket identifier for the network activity using bucketing criteria. The bucket identifier can be formed from bucketing criteria that correspond, map, or match network activity information.

When a computing device accesses the website and interacts with the communication tag (e.g., indicates an intent to make a phone call by selecting a button associated with the communication tag), the communication tag can fire and ping the analytics tag for the bucket identifier. The communication tag receives the bucket identifier from the analytics tag. Responsive to receiving the bucket identifier, the communication tag generates a second request to a server. The generated second request includes the preconfigured site identifier, the received bucket identifier, and the preconfigured target phone number. The server receives this second request and identifies a unique virtual phone number to allocate to the request. The server maintains a mapping of the {site identifier, bucket identifier, target phone number} to the allocated phone number for a predetermined amount of time.

The server can store the allocated phone number in memory of the data processing system or memory of the computing device for a predetermined time interval (e.g., 30 minutes). When the stored allocated number expires, the communication tag can generate a new request for an allocated phone number. The new request can correspond to new network activity that may or may not map to the same bucket identifier. In some cases, the analytics tag may determine that a bucket identifier for the network activity does not exist, and automatically generate a bucket identifier.

At least one aspect is directed to a method of allocating communication resources via information technology infrastructure. The method can be performed by a data processing system having one or more processors. The method can include the data processing system providing a communication tag established with a communication endpoint identifier and a site identifier for the web site. The data processing system can provide the communication tag for integration in a web site. The method can include the data processing system providing an analytics tag that uses bucketing criteria to determine a bucket identifier for a network activity of a computing device responsive to detecting network activity between the computing device and the web site. The data processing system can provide the analytics tag for integration in the web site. The method can include the data processing system receiving a request to allocate a phone number via the communication tag. The request can include a first field comprising the communication endpoint identifier, a second field comprising the site identifier for the web site, and a third field comprising the bucket identifier determined by the analytics tag based on the bucketing criteria. The method can include the data processing system determining a virtual phone number to assign to a combination of the communication endpoint identifier provided in the first field of the request, the site identifier provided in the second field of the request, and the bucket identifier provided in the third field of the request. The data processing system can determine the virtual phone number responsive to the request. The method can include the data processing system creating, in a map data structure, a link between the virtual phone number and the combination of the communication endpoint identifier stored in the first field, the site identifier stored in the second field, and the bucket identifier stored in the third field. The method can include the data processing system providing the assigned virtual phone number to the computing device prior to termination of the link.

In some implementations, the data processing system can receive the request including the third field having the bucket identifier, the bucket identifier identifying a source via that directed the computing device to the website and a medium via which the computing device accessed the website. The source can include one of the data processing system, direct, or referral. The medium can include one of organic, paid provider, none, or an identifier of a referral site. In some implementations, the data processing system can receive the request including the third field having the bucket identifier, the bucket identifier identifying a source, a medium, and a campaign identifier. The data processing system can receive the request including the third field having the bucket identifier, the bucket identifier identifying a source, a medium, and a search query keyword. The analytics tag can use bucketing criteria that includes at least one of a source that directed the computing device to the website, a medium via which the computing device accessed the website, a campaign identifier, a search query keyword, or a location.

In some implementations, the data processing system can receive, responsive to network activity of a second computing device on the web site, a request to allocate a phone number including a first field comprising the communication endpoint identifier, a second field comprising the site identifier for the web site, and a third field comprising the bucket identifier determined by the analytics tag based on the bucketing criteria. The second computing device can be different from the first computing device. The data processing system can perform a lookup in the map data structure using the combination of the communication endpoint identifier stored in the first field, the site identifier stored in the second field, and the bucket identifier stored in the third field to identify the assigned virtual phone number. The data processing system can provide the assigned virtual number to the second computing device.

The data processing system can receiving, responsive to network activity of a third computing device on the web site, a request to allocate a phone number including a first field comprising the communication endpoint identifier, a second field comprising the site identifier for the web site, and a third field comprising a different bucket identifier determined by the analytics tag based on different bucketing criteria. The third computing device can be different from the first computing device and the second computing device. The data processing system can create a second link between a second virtual phone number and a combination of the communication endpoint identifier stored in the first field, the site identifier stored in the second field, and the different bucket identifier stored in the third field. The data processing system can provide the second virtual phone number to the third computing device prior to termination of the link.

In some implementations, the data processing system can receive, via the communication tag, the request to allocate the phone number including the first field comprising the communication endpoint identifier, the second field comprising the site identifier for the web site, the third field comprising the bucket identifier determined by the analytics tag based on the bucketing criteria, and a fourth field comprising a network activity session identifier for the computing device. The data processing system can determine a number of active sessions associated with a provider of the website. The data processing system can create, responsive to the number of active sessions exceeding a threshold, the link between the virtual phone number and the combination of the communication endpoint identifier stored in the first field, the site identifier stored in the second field, and the bucket identifier stored in the third field.

The data processing system can receive, via the communication tag, a second request to allocate a phone number including a first field comprising the communication endpoint identifier, a second field comprising the site identifier for the web site, a third field comprising the bucket identifier determined by the analytics tag based on the bucketing criteria, and a fourth field comprising a network activity session identifier for a second computing device. The data processing system can determine a number of active sessions associated with a provider of the website. The data processing system can create, responsive to the number of active sessions less than a threshold, a second link between a second virtual phone number and a combination of the communication endpoint identifier stored in the first field, the site identifier stored in the second field, and the network activity session identifier stored in the fourth field. The data processing system can provide the second virtual phone number to the second computing device prior to termination of the second link.

The data processing system can access a plurality of available virtual numbers maintained in a pool data structure in memory of the data processing system. The data processing system can retrieve, responsive to the request via the communication tag, the virtual phone number from the plurality of available virtual numbers. In some implementations, a web browser of the computing device can launch the analytics tag prior to launching the communication tag. The analytics tag can determine that the bucket identifier has not been established. The analytics tag can determine, responsive to determining that the bucket identifier for the network activity of the computing device has not been established, the bucket identifier. The analytics tag can store the determined bucket identifier in a data file in memory of the computing device.

In some implementations, the data processing system can initiate an expiration module responsive to creating the link. The expiration module can terminate the link stored in the map data structure responsive to a termination event. In some implementations, the data processing system can determine that a request including the combination has not been received from one or more computing devices for a predetermined time interval. The data processing system can terminate, responsive to the determination, the link by removing the link in the map data structure between the assigned virtual phone number and the combination.

The data processing system can receiving, via the computing device, an indication to initiate a communication channel between the computing device and the data processing system via at least one of a selection or a mouse over of a graphical user interface object rendered by a web browser executed by computing device to provide the web site for display via the computing device. The data processing system can provide the assigned virtual phone number with instructions to launch, on the computing device, a communication application to establish the communication channel between the computing device and the data processing system. The data processing system can bridge the computing device with the endpoint identifier mapped to the virtual phone number to establish the communication channel. The web browser of the computing device can launch the communication tag responsive to an indication to initiate a communication channel for the computing device. The communication tag can request the identifier of the computing device from the analytics tag embedded on the web site. The communication tag can generate the request with a first field comprising the communication endpoint identifier, a second field comprising the site identifier for the web site, and a third field comprising the bucket identifier.

Another aspect is directed to a system to allocate communication resources via information technology infrastructure. The system can include a data processing system. The data processing system can include one or more processors and memory. The data processing system can include a tag server and an allocation engine. The tag server can provide, for integration in a web site, a communication tag established with a communication endpoint identifier and a site identifier for the web site. The tag server can provide, for integration in the web site, an analytics tag that uses bucketing criteria to determine a bucket identifier for a network activity of a computing device responsive to detecting network activity between the computing device and the web site. The allocation engine can receive, via the communication tag, a request to allocate a phone number. The request can include a first field comprising the communication endpoint identifier, a second field comprising the site identifier for the web site, and a third field comprising the bucket identifier determined by the analytics tag based on the bucketing criteria. The allocation engine can determine, responsive to the request via the communication tag, a virtual phone number to assign to a combination of the communication endpoint identifier provided in the first field of the request, the site identifier provided in the second field of the request, and the bucket identifier provided in the third field of the request. The allocation engine can create, in a map data structure, a link between the virtual phone number and the combination of the communication endpoint identifier stored in the first field, the site identifier stored in the second field, and the bucket identifier stored in the third field. The allocation engine can provide the assigned virtual phone number to the computing device prior to termination of the link.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
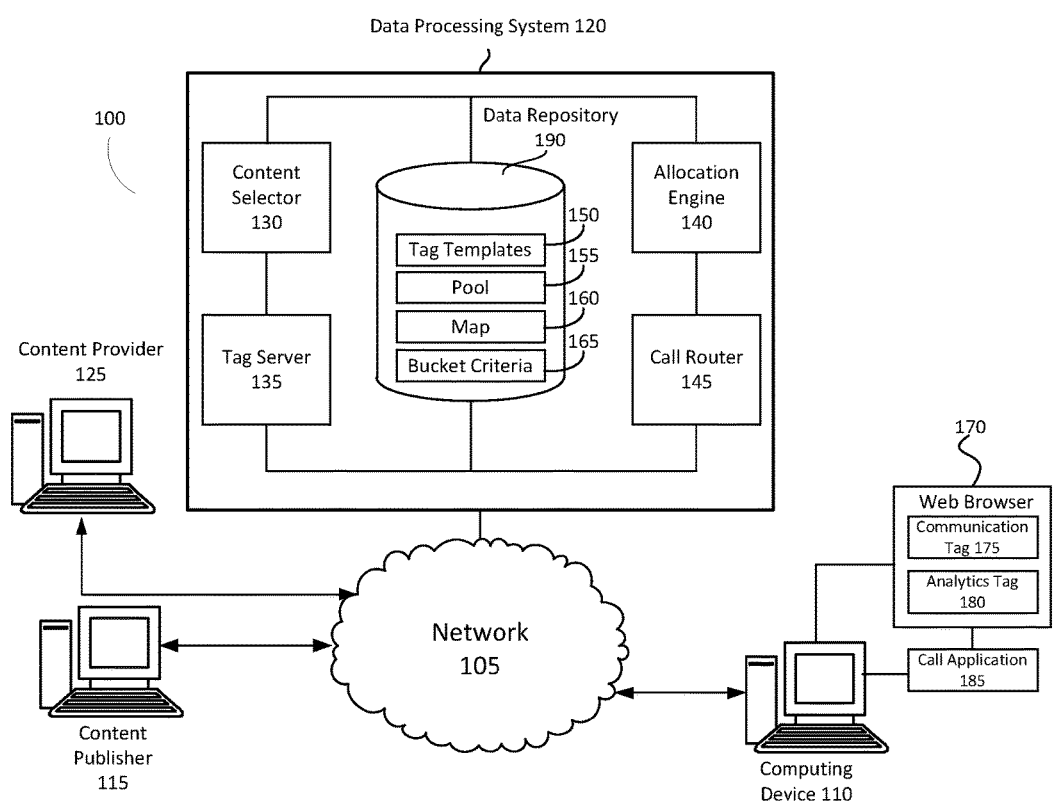
FIG. 1 is an illustration of a system to allocate communication resources via information technology infrastructure in accordance with an implementation.

Systems and methods of the present disclosure are directed to a data processing system that allocates communication resources via information technology infrastructure. The data processing system can be configured to route telecommunications using virtual numbers. For example, a computing device can access or interact with content (or content items such as advertisements) provided with a website via a computer network. The computing device can then initiate a communication channel using a number provided by the website to contact a corresponding content provider (e.g., an advertiser) or other provider of goods and services associated with the website. Advertisers may process data of the computing session to determine data interactions or processes that led to the initiation of the communication channel or a conversion (e.g., purchase of goods or services during a phone call). However, it may be challenging for a data processing system to identify calls or conversions responsive to a network activity session in which a computing device accesses data of a website via a computer network. In some cases, a data processing system may identify these calls by assigning a unique phone number to each network activity session so a call can be tied back to the network activity session. Because data processing system may manage tens of thousands of sessions going on in parallel and not all of the sessions are going to lead to a call, and phone numbers are limited resources, it may be challenging for a data processing system to assign a unique number to each session in a scale-able manner. For example, this may be challenging because of the limited number of resources available to the data processing system such as the limited amount of available phone numbers, the processing delay and resource consumption related to requesting a new phone number from a phone number provider and establishing the new phone number, The present technical solution provides systems and methods that allow for scalable tracking for website originated calls. The technical solution includes configuring a website with one or more tags. For example, a data processing system can provide two tags, such as java script tags, that interact with one another to generate a request for an allocated phone number (e.g., a unique virtual phone number allocated for this user session). The first tag can be a communication tag and the second tag can be an analytics tag. The communication tag can be preconfigured with a target phone number (e.g., the endpoint phone number of the advertiser). The communication tag can also be preconfigured with a site identifier, such as a unique identifier of the website a server generates by combining the website providers account identifier and a log identifier. The analytics tag can be configured to determine, identify or maintain computing session information and a bucket identifier for the computing session or computing device. A bucket identifier can be generated using one or more bucketing criteria that correspond to the network activity of the computing device, such as a source that directed the computing device to the web page, a medium via which the computing device accessed the web page, a content campaign name, a location of the computing device or a location associated with the web page, or a search engine keyword. Buckets can include, for example, {source, medium} of the channel, campaign name, keyword of the search query, location, interest, categories, or other campaign parameters. A network channel bucket can refer to {source, medium} as follows: {search engine, organic search}, {search engine, paid advertisements}, {direct, none}, {referral, site that referred}. A bucket can include a combination of one or more of these campaign parameters.

For example, the bucket identifier formed from bucketing criteria that correspond to a network activity session can capture or provide information related to network channels that directed the computing device to the website, and which channels are linked to computing devices associated with conversions. Network channels via which a user can be directed to the website can include, for example: (1) the user may directly access the website by inputting the website address into their web browser; (2) the user may perform an organic search using a search engine, and the website may be a search result; (3) the user may be referred to the website from a social networking site or other website; or (4) the user may be presented with an online advertisement for the website.

When a computing device accesses the website and interacts with the communication tag (e.g., indicates an intent to make a phone call), the communication tag launches, fires, or is triggered. Responsive to triggering of the communication tag, the communication tag pings the analytics tag for an identifier (e.g., computing session identifier or a computing device identifier). The analytics tag may access a data file storing the bucket identifier, retrieve the bucket identifier from the data file, and provide the bucket identifier to the communication tag. In some cases, the analytics tag may determine that the data file of the computing device does not include the bucket identifier (e.g., the bucket identifier field is undefined), and then generate the bucket identifier for the network activity computing session or computing device. The analytics tag can be configured to determine and maintain the campaign parameters associated with the user session and generate a bucket based on a combination of one or more campaign parameters. The communication tag receives the bucket identifier from the analytics tag. Responsive to receiving the bucket identifier, the phone tag generates a second request to a server or data processing system. The generated second request includes the preconfigured site identifier, the received bucket identifier, and the preconfigured target phone number. The data processing system receives this second request and identifies a unique virtual phone number to allocate to the request. The data processing system maintains a mapping of the {site identifier, bucket identifier, target phone number} to the allocated phone number for a predetermined amount of time.

In some implementations, the system can use a hybrid approach. For example, the system can be configured to perform session level tracking where unique virtual phone numbers are allocated on a per session basis up to a threshold number of users; and then use the bucketed allocation technique as the number of active user session exceeds the threshold number. While using the bucketed allocation technique foregoes session level granularity, the buckets can be based on a combination of campaign parameters to provide useful tracking information.

The data processing system can store the allocated phone number in memory on the computing device or data processing system for a predetermined time interval (e.g., 30 minutes). When the stored allocated number expires, the communication tag can generate a new request for an allocated phone number. The new request can correspond to a new computing session (e.g., network activity session). In some cases, the analytics tag may determine that a bucket identifier for the computing session does not exist, and automatically generate a bucket identifier for the network activity computing session.

For example, a data processing system can select and provide a call content item for display with a webpage. The call content item can include an advertisement (e.g., supplemental content item) in the form of a sponsored link (e.g., image, multimedia, video, text) included by the search engine (e.g., via content selector) in or alongside the search results (e.g., main content). In some cases, the call content item may include an advertisement in the form of a sponsored link in or alongside main content provided by a content publisher (e.g., an article or multimedia stream). The content item may include an executable tag such as a java script tag that provides a link or button to a phone number. The executable tag can send a request to the data processing system for an allocated virtual phone number. The data processing system, responsive to the request from the executed tag, can select, allocate, generate, provision or assign the phone number. This phone number can facilitate providing tracking data related to a network activity computing session to a content provider. This number may be a virtual phone number that is dynamically assigned, provisioned, allocated or generated for the content item. This phone number can be assigned to a bucket formed from bucketing criteria corresponding to the network activity computing session. A user can interact with the content item by selecting or clicking on a call button of the call content item to receive the virtual phone number. The user can then call the provided number. In some cases, the tag requesting the allocated phone number can automatically launch a communication application on the computing device to initiate the communication channel responsive to receiving the allocated virtual phone number from the data processing system.

The data processing system can identify tracking values (such as a bucket identifier corresponding to the computing session) associated with the received call or the content item. For example, the data processing system may tie, link, or otherwise associate the virtual phone number with an impression of the content item, a webpage hit, or computing session. The data processing system may then access an impression log for the content item, which may include keywords of the content item, the website the content item was displayed with, time of day, or content network.

In some implementations, the data processing system may initiate a call to the content provider and then bridge the two portions of the call (e.g., bridge the customer's call to the data processing system with the data processing system's call to the content provider). In some implementations, the data processing system may forward or route the call to the content provider. The content provider may determine, during or after the call, that a conversion occurred via the call (e.g., a purchase was made). The content provider can provide the conversion information to the data processing system. The data processing system can identify the content item impression data or tracking data corresponding to the call made via the virtual phone number, and update the content item impression record or data with the conversion information to generate a performance report.

In an illustrative implementation of providing an improved user experience on a mobile computing device, the data processing system provides two executable tags to a web publisher of a webpage. The data processing system can provide the two executable tags to the web publisher along with a call content item. The call content item can correspond to main content provided by the web publisher of the webpage, or supplemental content item provided by the data processing system for display with the webpage. A computing device may interact with the call content item via a computer network. This interaction may trigger at least one of the executable tags or cause the at least one executable tag to perform one or more actions. For example, the interaction can cause a first executable tag of the call content item to generate a request for an allocated virtual phone number. The first executable tag can interact with the second executable tag to create the request for the allocated virtual phone number. The first executable tag can then transmit the request to the data processing system. The data processing system can receive the request from the first tag. The request can include information about the computing session between the computing device and the web page, or one or more web pages. The information about the computing session can refer to a bucket identifier formed from bucketing criteria that corresponds to information of the network activity session. The data processing system can allocate a virtual phone number responsive to information provided in the request. The call content item may display the allocated virtual phone number for the advertiser. In some cases, the tag can be configured to launch a dialer application on the computing device and instruct the dialer application to initiate a communication channel using the received allocated virtual phone number. The data processing system can then bridge or route the call to the content provider.

The data processing system can be configured to use virtual phone numbers. A virtual phone number may refer to a telephone number without a directly associated physical telephone line. A virtual phone number may refer to a telephone number that is not static in that the telephone number may not be directly associated with a device. These virtual phone numbers can be programmed to forward incoming calls to one of the pre-set telephone numbers chosen by a content provider; either Fixed, Mobile or VoIP. A virtual phone number can work like a gateway between traditional calls (PSTN) and VOIP. Subscribers to virtual phone numbers may use their existing phones, without the need to purchase additional hardware. A virtual telephone number can be set to forward calls to different telephone numbers depending on the time of day and the day of the week.

The data processing system can be further configured to use the virtual phone number with a content item to identify calls made to the content provider. For example, with a call content item such as a call extension content item or call-only content item, the virtual phone number (or content forwarding number) can facilitate receiving and tracking phone calls resulting from the content item. To do so, the data processing system can assign, select or otherwise provide a virtual phone number to be displayed with the content item of a content provider. When a potential customer calls this virtual phone number, the data processing system receives the call and routes the call to the corresponding content provider. The content provider may then obtain information about the calls generated by the content item. In some cases, the data processing system may maintain the anonymity of the customer by providing the forwarding number as the caller identification number, rather than the customer's number.

In some implementations, the data processing system can record information about the content item when the data processing system assigns the virtual phone number to the content item. When the data processing system receives a call, the data processing system can perform a look up in a database to determine the recorded information from the virtual number record, and log that information about the content item along with the call information. Thus, in some implementations, the data processing system can indirectly rely on the virtual number to link the phone call to the originating content item, without using the virtual number to look up logs.

According to one aspect, a method of allocating communication resources via information technology infrastructure includes a data processing system providing a communication tag established with a communication endpoint identifier and a site identifier for a web site. The data processing system can provide the communication tag to a website publisher, advertiser, or computing device. For example, the data processing system can provide the communication tag to the computing device for execution by a web browser of the computing device. The data processing system can provide the communication tag to the website publisher for integration with the website prior to the computing device rendering the website. The data processing system can provide the communication tag to the advertiser for integration with an advertisement.

The method can include the data processing system providing, for integration in the web site, an analytics tag. The data processing system can provide the analytics tag to the website publisher so the website publisher can integrate the analytics tag with the website and include one or more parameters. The analytics tag can determine a bucket identifier using bucketing criteria that corresponds to network activity of a computing device. The analytics tag can determine the bucket identifier responsive to detecting network activity between the computing device and the web site. The method can include the data processing system receiving a request to allocate a phone number. The data processing system can receive the request via the communication tag causing the computing device to generate and transmit the request. The request can include a first field comprising the communication endpoint identifier, a second field comprising the site identifier for the web site, and a third field comprising a bucket identifier for the network activity session. The method can include the data processing system determining a virtual phone number to assign to a combination of the communication endpoint identifier provided in the first field of the request, the site identifier provided in the second field of the request, and the bucket identifier provided in the third field of the request. The data processing system can determine the virtual phone number responsive to the request from the computing device generated via the communication tag. The method can include the data processing system creating, in a map data structure, a link between the virtual phone number and the combination of the communication endpoint identifier stored in the first field, the site identifier stored in the second field, and the bucket identifier stored in the third field. The method can include the data processing system providing the mapped virtual phone number to the computing device prior to termination of the link.

FIG. 1 illustrates an example system 100 for allocating communication resources via information technology infrastructure. The system 100 can include content selection infrastructure. The system 100 can include a data processing system 120 communicating with one or more of a content provider 125, content publisher 115 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can include at least one content selector 130, at least one tag server 135, at least one allocation engine 140, at least one call router 145, and at least one data repository 190. The content selector 130, tag server 135, allocation engine 140, and call router 145 can each include at least one processing unit or other logic device such as programmable logic array engine, or module configured to communicate with the database repository or database 145. The content selector 130, tag server 135, allocation engine 140, and call router 145 and data repository 190 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 may include a content selector 130. The content selector 130 may analyze, parse, or otherwise process subject matter of candidate content items to determine whether the subject matter of the candidate content items correspond to a web page. The content selector 130 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector 130 may process the metadata to determine whether the subject matter of the candidate content item corresponds to the web page or search query.

Content providers may provide additional indicators when setting up a content campaign that includes content items. The content provider may provide information at the content campaign or content group level that the content selector 130 may identify by performing a lookup using information about the candidate content item. For example, the candidate content item may include a unique identifier, which may map to a content group, content campaign, or content provider. The content selector 130 may determine, based on information stored in data repository 190 about the content provider.

The data processing system 120 may select the content using various techniques. For example, the data processing system 120 may select content from a referral or a lead from a partner content selection network. In some implementations, the content may not be selected using a keyword or matching technique, but be selecting based on a referral or a lead.

For example, the data processing system 120 can receive a request for content. The request may include keywords or a query such as a search query input into a search engine of the data processing system. The input query may include text, characters, or symbols, for example. The data processing system 120 may receive the input query from a computing device 110 via network 105. The input query may include audio such as words spoken by a user of the computing device 110 and input into the search engine of the data processing system via network 105 and an interface. The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or otherwise widgets through which a user of a client can select or otherwise indicate a category for the search.

Responsive to the search query or other request for content (e.g., electronic advertisements), the data processing system 120 (e.g., via content selector 130) can identify, select or otherwise obtain content to be provided or presented via the computing device 110 making the request, or some other computing device 110 associated with the request for content. In some implementations, the data processing system 120 may identify, select, or otherwise obtain content not responsive to receiving any request. The content may include, e.g., text, characters, symbols, images, video, audio, or multimedia content. The content may include a phone number, a virtual phone number, or a call extension. The content item may include an advertisement in the form of a sponsored link provided by content providers and included by data processing system (e.g., via content selector) for display with the search results page. The content item may include a link or button to a phone number that facilitates providing reporting data to a content provider. In cases where the content item includes a virtual phone number or a call extension, the content item may be referred to as a call content item. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display on an online document (e.g., a web page). The data processing system may initiate or utilize an online auction process to select one or more of the multiple content items for display on the online document. An auction system may determine two or more bids for content items to be displayed in an online document. The auction system can run the bids through an auction process to determine one or more highest ranking bids or winning bids. Content items corresponding to the highest ranking or winning bids may be selected for display on or with the online document.

The data processing system 120 can include a tag server 135 designed and constructed to configure one or more executable tags and provide the executable tags to a content publisher 115, content provider 125, or computing device 110. The data processing system 120 can configure the tags with parameters or data. The data processing system 120 can further configure the tags to be embedded or otherwise integrated with a web page or content item. The data processing system can configure the tags to be rendered by a web browser of a computing device accessing the webpage.

The tag server 135 can generate or configure tags using a coding technique or language. In some cases, the tag server 135 can configure the tag to be executed by a web browser executing on a computing device 110. A tag can be configured to be executed by the web browser and cause or instruct the computing device 110 to perform an action. In some cases, the tag can be configured to be executed outside of the web browser. For example, the tag can launch an application that executes on the computing device without being executed by the web browser. In some cases, the tag can be partially executed by the computing device or by the web browser on the computing device, and partially executed by the data processing system 120.

The tag server 135 can generate a JavaScript tag. The JavaScript tag can correspond to a tag generating using a coding technique or script that is supported by a web browser. For example, the tag can be coded using a standardized implementation of a script, such as the European Computer Manufacturers Association ("ECMA") ECMA-262 script. The tag server 135 can configure a JavaScript tag to send hypertext transfer protocol ("HTTP") requests behind the scenes and customize or update certain section of a webpage or website. Sending the HTTP request behind the scenes can refer to the tag sending the HTTP request without causing a complete refresh of the webpage, thereby providing a more powerful and user friendly graphical user interface or web interface.

The tag server 135 can generate or configure the tag to include a client-side script. The tag server 135 can generate the tag with a <script> element that includes scripting statements or a pointer or link to an external script file. The tag server 135 can generate or configure the tag to point to an external script file using a src attribute of the tag. An external script can be executed asynchronously with the rest of the web page (e.g., the script executed while the web page continues parsing), or when the page has finished parsing.

In some cases, the tag server 135 can configure the tag with a <noscript> element. The <noscript> element can be used in situations in which the client computing device 110 or web browser executing thereon does not support client-side scripting, or client-side scripting has been disabled. The tag server 135 can configure one or more attributes of the tag with one or more values, including, for example: attribute async with value async (specifies that the script is executed asynchronously); attribute charset with a value that specifies the character encoding used in an external script file); attribute defer with value defer that indicates that the script is executed when the page has finished parsing); attribute src with a value including a uniform resource locator that identifies a location of an external script; or attribute type with a value that specifies a media type of the script.

The tag server 135 can generate or configure one or more types of tags. A first type of tag can include a communication tag and a second type of tag can include an analytics tag. The tag server 135 can configure or generate the tags in an offline process or in real-time. Generating the tag in an offline process can refer to generating or configuring the tag independent of a computing device accessing a website on which the tag is to be rendered or independent of rendering a web page on a computing device. For example, the data processing system 120 can provide a tag setup interface to a content provider 125 or content publisher 115. A content provider 125 may set up one or more parameters or attributes of the tag via the tag setup interface. The data processing system 120 can store the configuration for the tag in data repository 190. The data processing system 120 can store the configuration for the tag in a tag template data structure 150 in data repository 190.

The data processing system 120 can provide the tags to one or more entities. The data processing system 120 (via tag server 135) can provide a first type of tag to a first entity and a second type of tag to a second entity. The data processing system 120 can provide the communication tag to a content provider 125 for the content provider 125 to integrate the communication tag with a content item such as an advertisement. The data processing system 120 can provide the communication tag to a website publisher 115 for the website publisher 115 to integrate the communication tag with a website. The data processing system 120 can provide the analytics tag to the web site publisher 115 for the web site publisher to integrate with the web site. The data processing system 120 can provide the communication tag or the analytics tag to the computing device 110 to be executed by the web browser 170 of the computing device 110.

The data repository 190 can include a tag template data structure 150 that stores a communication tag template for a communication tag and an analytics tag template for an analytics tag. The communication tag template may specify, define, or provide fields, attributes, or configurations for the communication tag. For example, the communication tag template can specify values for attributes such as async and a src URL for the external script file. The communication tag template may provide rules, instructions or conditions related to a trigger event, actions to perform responsive to a trigger event, and fields to include in a data request.

For example, the communication tag template may define a trigger event based on detecting an interaction with an object associated with the communication tag. An object associated with the communication tag can include a graphical user interface widget, such as a button, link, dropdown menu, or icon. An interaction with the object can refer to a selection or click of the object (e.g., mouse click or touch input selection), mouse over, audio input, gesture, or motion. The communication tag can detect the interaction or instruct the web browser or other application executing on the computing device 110 to detect the interaction. The template can indicate whether the interaction satisfy a trigger event threshold to cause the tag to trigger or launch to perform one or more actions responsive to detecting the interaction. The trigger event can be satisfied if the selection of the object is followed by another interaction. For example, the user selects a button which causes the tag to provide a pop up window requesting the user to confirm that they are requesting a phone number. In another example, the trigger event can be satisfied if the selection of the object is not followed by another interaction for a predetermined time interval (e.g., 1 second, 2 seconds, 0.5 seconds, or 0.75 seconds). For example, the user may select the button associated with the communication tag, but then close the web browser window, minimize the window, or otherwise terminate access to the web page or website via which the communication tag is provided. Responsive to detecting one of these termination-related events within a predetermined time interval of the selection event, the communication tag may determine that a trigger event is not satisfied and further determine not to perform actions relating to requesting an allocated virtual phone number.

The communication tag template can include or define actions for the communication tag to perform responsive to detecting a satisfactory trigger event. A tag performing an action can refer to a tag configured to or executed to cause a web browser, processor, or computing device to perform the action. Actions can include, for example, generating a request for an identifier, generating a request for an allocated virtual number, launching a call application to initiate a communication channel using the received allocated virtual number. The communication tag template can include instructions to configure the communication tag to generate a request for an identifier of the computing device or an identifier of a computing session associated with the computing device. The communication tag can interact with the analytics tag to generate the request for the allocated virtual number. The communication tag can transmit the request (or cause the computing to transmit the request) for the identifier to the analytics tag.

The analytics tag can receive the request for the identifier via the communications tag. The data processing system 120 can generate or configure the analytics tag using an analytics tag template that includes rules, instructions or attributes. The analytics template can be used to configure the analytics tag to determine attributes, features or criteria of the network activity session and generate a bucket identifier using bucketing criteria that correspond to the attributes of the network activity session.

The analytics tag can form a bucket identifier using bucketing criteria that correspond to the attributes of the network activity session. The analytics tag can form the bucket identifier using values for the bucketing criteria corresponding to the network activity session of the computing device. Bucketing criteria can include a source or network channel that directed the computing device to the website, a medium via which the computing device accessed the website, a campaign identifier, a search query keyword, a location, or a time stamp. Bucketing criteria can be stored in a bucket criteria data structure 165 in data repository 190. Bucket identifier can be based on values for the bucket criteria. The analytics tag, computing device or data processing system can determine the values for the bucketing criteria based on information about the network activity session, such as a source or network channel that directed the computing device to the website, a medium via which the computing device accessed the website, a campaign identifier, a search query keyword, a location, or a time stamp. For example, a bucketing criteria can be "source" and a value can be "Search_Engine_Provider_A"

The source and medium can indicate how the computing device was directed to the website. For example, the source can indicate one or search engine, direct, or referral; and medium can indicate one of organic, paid provider, none, or an identifier of a referral site. A bucket formed of a combination of bucket criteria including source and medium {source, medium} can include, for example, the following values: {search engine, organic search}, {search engine provider A, paid advertisements}, {direct, none}, {referral, site that referred}. For example, the {source, medium} bucket can indicate that a computing device was directed to the website as follows: (1) the user may directly access the website by inputting the website address into their web browser; (2) the user may perform an organic search using a search engine, and the website may be a search result; (3) the user may be referred to the website from a social networking site or other website; or (4) the user may be presented with an online advertisement for the website.

The analytics tag can generate a bucket identifier using a combination of bucketing criteria that correspond to the network activity session. A bucket identifier can be formed from bucketing criteria such as one or more of the network channel, medium of the network channel, campaign name, keyword of the search query, location, or other campaign parameters. Location can be determined by a location sensor of the mobile device, WiFi, cell phone tower triangulation, IP address, or user input (e.g., location keyword in a search query, or user profile information). The location can include a city, town, state, zip code, geographic area, or map tile.

Example buckets formed of one or more bucketing criteria can include: {source, medium}, {source, medium, campaign name}, {source, medium, campaign name, location}, {source, medium, keyword of the search query}, {source, medium, keyword of the search query, campaign name}, or {source, medium, keyword of the search query, location}. The analytics tag can use the bucket information to generate a bucket identifier. The bucket identifier can include strings, characters, text, alphanumeric, or symbols. Bucket identifiers can include, for example: {paid advertisement}, {search engine, paid advertisement}, or {referral, www_example_dot_com}.

In some implementations, the analytics template can be used to configure the analytics tag to determine and provide a bucket identifier for a network activity session of the computing device responsive to the request for the identifier from the communications tag. A computing session can refer to or include a web browsing session. A computing session can include a semi-permanent interactive information exchange between two or more communicating devices. A session can be set up or established at a certain point in time, and then terminated at a later point in time. A computing session can be stateful in that one of the communicating devices saves information about the session history in order to communicate.

In some cases, a computing session may refer to a group of network interactions that take place on a website within a given time frame. For example, a single computing session can contain multiple screen or page views, events, social interactions, and ecommerce transactions. A single computing device can establish multiple sessions that may occur on the same day, or over several days, weeks or months. When one session ends, a new session may begin. Computing sessions can expire based on time (e.g., after 30 minutes of inactivity or at midnight). Computing sessions can expire based on a change in browsing context or a change in an advertisement campaign source. For example, if a computing device accesses the website via a first campaign, leaves the website, and then comes back to the website via another advertisement campaign, then the data processing system 120 can identify the second visit as corresponding to a second computing session.

The data processing system 120 can use the analytics template to configure the analytics tag to determine whether a bucket identifier for the computing session has been previously established. If the analytics tag determines that a bucket identifier for the computing session has yet to be established, the analytics tag can create or establish a bucket identifier. In some cases, the data processing system 120 can generate a network activity session identifier to for session-level tracking. The analytics tag can generate a request to the data processing system 120 for a unique identifier of the session. The data processing system 120 or the analytics tag can create the bucket identifier or session identifier using a combination of parameters or attributes associated with the computing session, such as a time stamp, web site identifier, computing device identifier, location identifier, source, medium, campaign name, or search query keyword. In some cases, the data processing system 120 or analytics tag can apply a hash function to a tuple formed of bucket values or the values of these attributes to generate a hash value, and use the hash value as the bucket identifier or session identifier.

Upon determining or creating a bucket identifier for the computing session, the analytics tag can respond to the request from the communication tag with the identified bucket identifier of the computing session. The communication tag receives the bucket identifier of the computing session and uses the bucket identifier to generate a request for an allocated virtual number. The communication tag can be preconfigured with certain fields to use to generate the request. For example, the communication tag template can include instructions for generating a request with a first field including a communication endpoint identifier, a second field including a site identifier for the web site the computing device is accessing, and a third field including the bucket identifier for the computing device. The communication tag can populate the fields configured by the communication tag template. The communication tag may further be preconfigured with values for one or more of the predetermined fields. For example, a content provider 125 or content publisher 115 can preconfigure the communication tag with a communication endpoint. The communication endpoint can correspond to a telephone number of the content provider 125 or content publisher 115. The communication endpoint can refer to an identifier used to establish a communication channel between the computing device and a communication device configured to receive a communication directed to or addressed to the identified communication endpoint.

In some cases, the communication endpoint can correspond to a customer service center of an advertiser or provider of goods or services. The communication endpoint can refer to a call forwarding engine that receives a request to establish a communication channel, and forwards the request to an available communication device, customer service representative, or agent.

The site identifier for the website can include a uniform resource locator or uniform resource identifier of the website. The website can be the website the computing device 110 accesses via network 105. The data processing system 120 provides the analytics tag and communication tag for integration on the website. The data processing system 120 can preconfigure the communication tag with the site identifier prior to providing the communication tag to the content publisher 115 of the website. In some cases, the communication tag can request the site identifier from the data processing system 120. The data processing system 120 can generate the site identifier as a unique site identifier. The data processing system 120 can generate the site identifier using one or more identifiers or attributes associated with the website. The site identifier can be specific to the website. The data processing system 120 can, for example, combine values such as an account number, property identifier, or a log identifier to generate the site identifier. The site identifier can be a string formed of numbers, letters, or symbols. A property identifier can include a website, mobile application or blog that is associated with the unique identifier. An account can correspond to an account of the content publisher 115 or the content provider 125. The account can include one or more properties. For example, the data processing system 120 can generate a site identifier by combining an account number (e.g., Account_1234) with a property identifier (e.g., example.com). The data processing system 120 can combine the account number and property identifier by appending one to the other; applying a hash function to the account number and property identifier to generate a unique hash value; applying an encryption protocol; converting the account number and property identifier to binary values, hexadecimal values, or otherwise combining these values to generate a unique site identifier. The data processing system 120 can store, in a map data structure 160, the mapping of the account number and property number to the generated site identifier.

The communication tag can generate an HTTP request that includes the communication endpoint identifier, site identifier, and bucket identifier. The communication tag can forward the HTTP request to the data processing system 120. For example, the web browser executing the communication tag on the computing device 110 can forward the generated HTTP request to the data processing system 120 via network 105. The computing device 110 can generate one or more data packets including header information that includes a network address for the data processing system 120, an internet protocol address of the computing device. The data packet can further include a payload that includes one or more of the first, second and third fields. The payload can further include parameters of the request, such as the type of request (e.g., request for an allocated virtual phone number).

The data processing system 120 can receive the request via network 105 from the computing device 110. The data processing system 120 can process or parse the data packets comprising the request. The data processing system 120 can determine that the request is for an allocated virtual phone number. The data processing system 120 can further determine that the request is for an allocated virtual phone number corresponding to the communication endpoint included in a first field of the request, a site identifier included in a second field of the request, and a bucket identifier included in a third field of the request.

The data processing system 120 can include an allocation engine 140. The allocation engine 140 can be designed and constructed to identify or allocate a virtual phone number (e.g., a unique forwarding number). The allocation engine 140 may provide the virtual phone number to the communication tag that generated the request for the virtual phone number. The allocation engine 140 can provide the requested virtual phone number for display with website requested the virtual number. The virtual number may be unique because it uniquely corresponds to a communication endpoint during a time interval. The virtual number may be unique because it uniquely maps to a content provider's device or call engine. The allocation engine 140 may provide a link to the unique virtual phone number that, when selected by a user of the computing device 110, causes the computing device 110 to initiate a communications channel with the data processing system 120. For example, selecting the link provided by the allocation engine 140 via the computing device 110 can initiate a phone call to the data processing system 120.

In some implementations, the data processing system 120 can provide the virtual phone number for display with the content item on the webpage responsive to receiving an indication of interest in the content item. For example, the data processing system 120 can display the content item on the webpage with a button, drop down menu, icon, roll-over icon, or other user interface widget. When a user interacts with the user interface widget (e.g., clicking or selecting a button), the data processing system can receive an indication of the user selection.

Responsive to receiving the indication of user selection, the data processing system 120 can identify, select, generate or otherwise assign a virtual phone number to the content item. The virtual phone number may be a toll free "800" number, a charge number such as a "900" number, a local number, or a long distance number. The data processing system 120 may access a pool or repository 155 of available virtual phone numbers. In some implementations, available virtual numbers in the pool can be allocated to one or more different content providers, website providers or other entities. In some implementations, the pool of virtual numbers 155 can include groups of virtual numbers where each group is pre-assigned to a corresponding content provider, website publisher, or other entity. For example, a first group of virtual numbers may already be assigned to the content provider associated with the content item, and the data processing system 120 selects the available number from the corresponding group of pre-assigned virtual numbers. In some cases, the virtual phone numbers may already be assigned to the website publisher associated with the website, and the data processing system 120 selects the available number from the corresponding group of pre-assigned virtual numbers. The virtual phone numbers may be assigned to a content campaign or a content group that includes the content item. In some implementations, the pool of virtual numbers can be used across different content providers, website publishers or entities. Allocating available virtual numbers from the pool to different entities allows the data processing system to perform load balancing, thereby reducing the total number of available virtual numbers that are maintained in the pool 155. Thus, by improving communication resource allocation, the data processing system can reduce resource consumption. For example, a tax service provider may be associated with an increase in sessions and calls as April 15 (tax due date) approaches. However, a snow removal service provider may receive few calls during April. Thus, rather than maintain different groups of pre-assigned virtual numbers for different entities, the data processing system can maintain a pool of virtual numbers that can be allocated across different entities.

The data processing system may determine the virtual phone number to be an available virtual phone number if the virtual phone number is not currently assigned to another content item or content provider. For example, due to the limited number of virtual phone numbers and the costs associated with purchasing phone numbers, the allocation engine 140 may be configured with one or more policies that facilitate reusing or recycling virtual phone numbers. The allocation engine 140 may reuse a virtual number if the number has not been provided for display for a time interval or duration (e.g., 2 hours, 24 hours, 72 hours, a week, 30 days, 60 days, 90 days, etc.). The data processing system can use the same virtual number for different provider devices. The data processing system can determine to which provider device to forward the call based on a caller ID of the caller and the virtual phone number. For example, the data processing system can form a tuple based on values provided in the request generated by the communication tag. For example, the tuple can be based on two or more of the communication endpoint, the site identifier, the bucket identifier, or the computing session identifier. The data processing system 120 can identify an available virtual phone number maintained by the data processing system 120 in a pool data structure 155 containing one or more available virtual phone numbers. The data processing system 120 can allocate, map, or otherwise assign the identified available virtual phone number to the tuple formed from the values contained in the one or more fields of the request generated by the communication tag executed by the web browser on the computing device 110.

The data processing system 120 can assign the allocated virtual phone number to a combination of the communication endpoint identifier, the site identifier, and the bucket identifier. The data processing system 120 can store this assignment in the map data structure 160. The assigned virtual phone number can correspond to a virtual phone number managed by the data processing system 120.

The combination of the communication endpoint identifier, the site identifier, and the bucket identifier can be referred to as a tuple. Combining these values can refer to appending the values to one another, applying or inputting the values into a hash function to generate a hash value representing the combination of values, or generating coordinates formed from the three values (e.g., (x, y, z)). Table 1 illustrates an example of mapping the values to an allocated virtual phone number.

TABLE 1

Mapping allocated virtual number to combination of fields

| Request # | Communication Endpoint Identifier | Site Identifier | Bucket Identifier | Allocated virtual phone number |
|---|---|---|---|---|
| 1 | 555-555-0001 | ABC_123 | {search_engine_provider_A, organic} | 888-888-0001 |
| 2 | 555-555-0001 | ABC_123 | {direct, none} | 888-888-0002 |
| 3 | 555-555-0001 | DEF_456 | {search_engine_provider_A, paid advertisement} | 888-888-0003 |
| 4 | 555-555-0001 | ABC_123 | {search_engine_provider_A, organic} | 888-888-0001 |

Table 1 illustrates mapping the allocated virtual number to the combination of fields provided in the request generated by the communication tag. As shown in this example, the communication endpoint identifier (e.g., 555-555-0001) are the same for each request. However, the site identifier for the third request (e.g., DEF_456) varies from the site identifier of the first, second and fourth requests (e.g., ABC_123). Also, the bucket identifier of the first and fourth requests (e.g., {search_engine_provider_A, organic}) is different from the bucket identifier of the second request {direct, none} and third requests ({search_engine_provider_A, paid advertisement). The bucket identifiers may be different because the network channel information (e.g., source, medium) of the network activity sessions for the requests is different. The computing session may be different because the website can be accessed from different sources or mediums. The fourth computing session of the fourth request may be the same as the first computing session of the first request because the source and medium of the two network activity sessions may be the same. Thus, the data processing system can determine a previously allocated phone number for the fourth request because the combination of the fields of the fourth request is the same as the combination of fields as the first request.

As shown in the table, the data processing system 120 can receive multiple requests and intelligently allocate virtual numbers while providing bucket-level tracking information. Intelligently allocating a virtual number can include reusing virtual phone numbers when the combination of fields in the request, including the bucket identifier, are the same. As shown in the table, the data processing system can receive a fourth request to allocate a phone number that is the same as the first request. The data processing system can receive the fourth request from a different computing device that transmitted the first request. The data processing system can perform lookup in the map data structure using the combination of the communication endpoint identifier stored in the first field of the second request, the site identifier stored in the second field of the second request, and the bucket identifier stored in the third field of the second request to identify the assigned virtual phone number. Even though the fourth request is from a different computing device than the first request, the data processing system can, via the lookup, identify the same assigned virtual number and provide the assigned virtual number to the second computing device.

As shown in Table 1, the data processing system can receive a second request to allocate a phone number. The second request can be from a computing device that is a same device or a different device from the first computing device. The second request can include the same communication endpoint identifier and the same site identifier as the first request in Table 1. However, the second request can include a different bucket {direct, none} identifier that is different from the bucket identifier for the first request in Table 1. The analytics tag can cause the computing device to determine a different bucket identifier because the second request can correspond to a network activity session having different values for the bucketing criteria. The data processing system can create, in the map data structure, a second link between a second virtual phone number and a combination of the communication endpoint identifier stored in the first field, the site identifier stored in the second field, and the different bucket identifier stored in the third field.

The data processing system 120 can generate a link in the map data structure 160 between the combination of the communication endpoint identifier, site identifier, and bucket identifier. The data processing system 120 can assign one or more attributes to the link, such as a link creation time stamp that indicates when the link was created, a request time stamp that indicates when the data processing system 120 received the request or the communication tag generated the request. The data processing system 120 can assign a termination event to the link that causes the link to terminate or expire. For example, the data processing system 120 can initiate an expiration module configured with a termination event. The data processing system 120 can initiate, configure, set, launch or otherwise execute the expiration module responsive to creating the link. The expiration module can terminate the link stored in the map data structure responsive to occurrence of the termination event. The data processing system 120 can remove the link from the map data structure 160 responsive to the termination event, causing the link to expire. The termination event can be based on length of time the data processing system has not received a request corresponding to the combination of fields. For example, the data processing system can determine that a request including the combination has not been received from one or more computing devices for a predetermined time interval (e.g., 30 minutes, 1 hour, 2 hours, 6 hours, or 12 hours). Responsive to determining that a request for the combination has not been received during the predetermined time interval, the data processing system can terminate the link by removing the link in the map data structure between the assigned virtual phone number and the combination.

The data processing system 120 can maintain the combination formed from the three tuple of the communication endpoint, site identifier, and bucket identifier as a unique tuple. The data processing system can use the same assigned virtual number for one or more requests from one or more computing devices corresponding to one or more computing sessions containing the same three tuple. In some cases, the data processing system 120 can reuse the virtual phone number for a different bucket identifier after a termination event or expiration. By preserving the tuple mapping, the data processing system 120 can reuse virtual phone numbers, thereby reducing the amount of virtual phone numbers the data processing system maintains.

The data processing system 120 can provide the virtual phone number to the communication tag on the computing device 110. The communication tag can display the virtual phone number. In some implementations, the communication tag can cause, responsive to receiving the allocated virtual phone number from the data processing system 120, a call application on the computing device to initiate a communication channel using the received allocated virtual phone number. For example, the computing device 110 can be configured with a call application 185. The call application 185 can be a native application or built-in application on the computing device, or a third-party call application installed by a user of the computing device 110. The communication tag can generate a request (e.g., a third request) to the call application 185 to initiate the communication channel and provide the call application with the allocated virtual phone number. The communication tag can instruct a call application 185 to initiate the communication channel using the allocated virtual phone number. The communication tag can launch the call application 185, and then control the call application 185 to cause the call application to initiate a communication channel using the allocated virtual phone number. For example, the communication tag can be configured with a call application programming interface containing one or more libraries that provide tools used to instruct, control, or otherwise communicate with a call application configured on the computing device 110.

Figure 3:
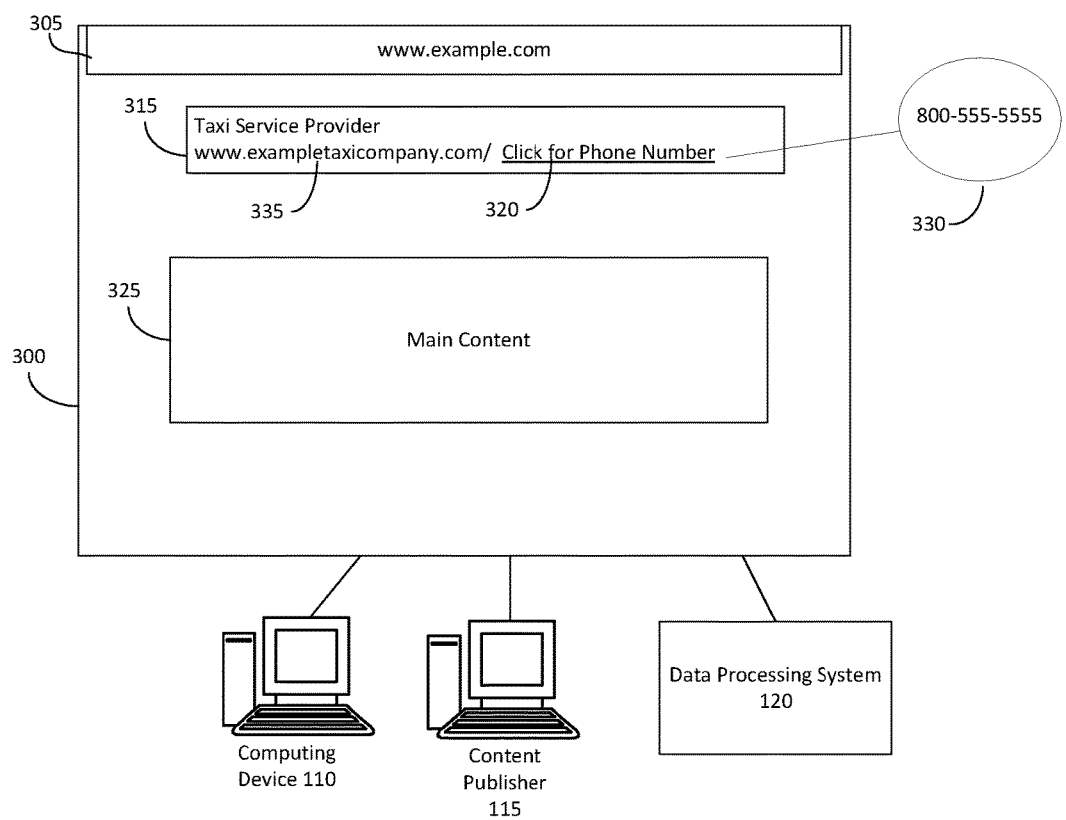
FIG. 3 is an illustration of a graphical user interface with data objects generated based on executed tags interacting with a data processing system to allocate communication resources via information technology infrastructure in accordance with an implementation.

The virtual phone number can be provided with a content item via a user interface. An example of a user interface provided by the data processing system is illustrated in FIG. 3. The data processing system 120 (e.g., via the allocation engine 140) can provide the first virtual phone number via the webpage. A computing device 110 may include call capabilities and may initiate a call (or other telecommunications channel) to the virtual phone number by dialing the number or selecting an interactive link of the number which initiates a call process of the device 110. In some implementations, a user may initiate the call to the virtual phone number from a device different from the device 110 on which the web page and phone number is displayed. For example, a user may view the web page with the advertisement and phone number from a desktop computer, laptop computer, or tablet, and then call the number from a land line phone or cellular phone. Since the data processing system 120 can assign the virtual phone number to the selection of the content item and link the virtual phone number with session data for the website or content item, a user may call the virtual phone number from a different device and the data processing system 120 can still access the corresponding tracking data.

The data processing system 120 can receive a call from a communication device such as computing device 110, or other communication device associated with the computing device 110, to initiate a first communication channel via the first virtual phone number. The data processing system 120 can include a call router 145 designed and constructed to receive a request to initiate a communication channel corresponding to the allocated virtual phone number and establish the communication channel. The data processing system 120 (e.g., via call router 145) can receive a call from the computing device 110 directed to the allocated virtual phone number. For example, the computing device 110 may dial the first virtual phone number to initiate the telecommunications channel and the data processing system 120 may receive an indication of initiation of the telecommunication (e.g., a ring). The data call router 145 may perform one or more functions upon receiving the call (or indication thereof).

Responsive to receiving the call, the data processing system 120 can perform a lookup in a database using the allocated virtual phone number to identify a second number corresponding to the communication endpoint (e.g., the communication endpoint preconfigured on the communication tag). The data processing system 120 can also identify computing session data corresponding to the bucket identifier mapped to the allocated virtual phone number in the map data structure 160. For example, the first virtual phone number may be used to call the data processing system 120 and further used to access data associated with the bucket identifier and identify the communication endpoint identifier of a content provider device 125. For example, the bucket identifier can be a hash value formed from a hash function applied to bucket criteria values. The data processing system 120 can store, in data repository 190, an index that maps the hash values to the bucket criteria values. The communication endpoint identifier may be used to call the content provider (or customer service representative or agent device thereof). In some cases, the content provider may provide the second number when setting up the content campaign, and the second number may be stored in a database of the data processing system 120.

The data processing system 120 can, upon identifying the second number, use the second number to establish a second communication channel between the client device and a content provider device. The data processing system 120 (e.g., call router 145) may dial the second number and the content provider may receive the call. The content provider (or customer service representative) may answer the call. The call router 145 may route, forward, merge or bridge the first call with the second call to create the second communication channel that connects the user with the customer service representative of the content provider. In some cases, the call router 145 includes a bridging module configured to bridge the calls. The bridging module can include hardware or software configured to bridge calls. The bridging module can be configured with a data packet routing or relaying technique to facilitate communication between the computing device initiating the call and the provider device receiving the call.

The data processing system 120 can monitor or determine one or more aspects of the computing session of the computing device 110 to determine bucket criteria values and form a bucket identifier. The analytics tag can facilitate determining one or more aspects of the computing session of the computing device 110. The data processing system 120 may be designed and constructed to receive, obtain, determine or otherwise identify tracking data such as content item impression data or log entry data and store the data in data repository 190 in one or more databases or data structures such as session data structure 165. Content item impression data may include information associated with a content item, selection of the content item, or an impression of the content item. For example, tracking data may include content selection criteria that were used to select the content item for display with or on a web page. Content selection criteria may include keywords, terms, phrases, geographic location, device type, etc. The data processing system 120 may obtain tracking data from or via the content selector 130, a content provider 125, or a user's computing device 110. In some cases, the data processing system 120 may store the tracking data in an impression log or data structure in data repository 190, and the data processing system 120 may obtain the tracking data from the impression data structure.

The data processing system 120 can detect, identify, determine or otherwise obtain log entry data. Log entry data can include communication channel information such as voice call information associated with the content item impression. Voice call information can include, e.g., a start time of a voice call, a device identifier of a device that initiated the voice call (e.g., a caller ID of the computing device 110 that calls the virtual phone number provided by the call content item), and a duration of the voice call. The data processing system 120 can detect the start time of the voice call responsive to receiving the call. The data processing system 120 can include a counter, timer, clock, or other timing device configured to generate a time stamp responsive to receiving the call. In some cases, the data processing system 120 generate a time stamp in a time zone. The data processing system 120 can generate the time stamp in a default time zone, such as UTC or GMT. The data processing system 120 can generate the time stamp in a predetermined format, that includes, for example, the date and time and includes seconds as follows: <YYYY-MM-DD><HH:MM:SS>, where YYYY corresponds to the year in four digits; MM corresponds to the month number in two digits; HH corresponds to the hour in a 24 hour format in two digits; MM corresponds to minutes in two digits; and SS corresponds to seconds in two digits. For example, the time stamp can be: 2015-01-20 00:09:00. In some cases, the data processing system 120 can generate the time stamp in a time zone corresponding to a location of the computing device 110, or a location of a content provider 125 that provided the content item that resulted in the phone call. For example, the data processing system 120 can determine, from a content account of the content item, location information established by the content provider 125. In some cases, the content item can include location information (e.g., an address for a restaurant).

The session data structure 165 can be stored in data repository 190. The session data structure 160 can include a table format or other data format for storing, maintaining, organizing or manipulating impression records. An impression record may refer to an instance of displaying a content item or advertisement on a web page. The impression may include information about the web page on which the content item is displayed (e.g., uniform resource locator of the web page, location/position of the content slot, keywords of the web page), search query input by the user into a search engine that resulted in the content item being selected, a keyword of the content item and/or a keyword of the web page or search query that resulted in the content item being selected for display (e.g., via a broad, phrase or exact match or other relevancy or similarity metric), time stamp associated with the impression, geographic location of the computing device 110 on which the content item is displayed, or type of device.

The data processing system 120 may store content item impression records in the data repository 190 on a temporary basis and remove or delete the impression records after some duration (e.g., 24 hours, 48 hours, 72 hours, 30 days, 60 days, 90 days, etc.). The data processing system 120 may remove the impression records responsive to an event, condition or trigger. For example, the data processing system 120 may delete the impression record responsive to a request to delete impression history information, or after a time interval or duration after termination of the call associated with the impression.

The data processing system 120 can generate a link between the tracking data stored in the session data structure 165 and the virtual phone number assigned to the combination of fields stored in the map data structure 160. The link may include a pointer or other association mechanism between the tracking data and the virtual phone number. In some cases, the data processing system 120 may update the impression record in the session data structure with the mapped virtual phone number. In some cases, generating the link may refer to the data processing system 120 generating a second data structure or data record or entry that includes the tracking data and the virtual phone number. For example, the data processing system 120 may create a tracking link data structure that provides an entry with the tracking data that is associated with a corresponding virtual phone number. This data structure may further include information about the impression record or the computing device 110.

In some implementations, the computing device 110 can be configured with a web browser 170. The web browser 170 can be configured to access a web site provided by the content publisher 115. The web browser 170 can be configured to receive instructions, modules, executable files, or other data of the web site. The web browser can execute, launch, run, or otherwise process a communication tag 175 or an analytics tag 180 integrated in the web site data. The web browser 170 can be configured with a rendering engine that parses HTML to construct a document object model ("DOM") tree. The rendering engine of the web browser 170 can start parsing the HTML document and turn the tags to DOM nodes in a tree called the "content tree". The web browser 170 can parse the style data, both in external CSS files and in style elements. The rendering engine of the web browser 170 can then render the tree construction. The web browser 170 can use the styling information together with visual instructions in the HTML will to create the render tree. The render tree can include rectangles with visual attributes like color and dimensions. The rectangles are in the right order to be displayed on the screen. After the construction of the render tree, the rendering engine of the web browser 170 can perform a "layout" process. During the layout process, the web browser 170 can give each node the exact coordinates where it should appear on the display screen of the computing device 110. Next, the render engine of the web browser 170 paints the render tree. To paint the render tree, the web browser 170 traverse and each node and paints each node using the UI backend layer. To improve the user interface experience, the rendering engine can display contents on the screen as soon as possible. Thus, the render engine may not wait until all HTML is parsed before starting to build and layout the render tree. The render engine can parse and display parts of the content while the process continues with the rest of the contents that keeps coming from the network.

The data processing system 120 can provide the communication tag 175 and analytics tag 180 that are parsed and rendered by the rendering engine of the web browser 170. The data processing system 120 may provide the tags 175 and 180 to the content publisher 115, and the content publisher may integrate the tags into the website accessed by the web browser 170. In some implementations, the data processing system 120 can provide the tags 175 and 180 directly to the computing device. For example, the website data may include a link or pointer to the tags. The website data may include instructions that instruct the computing device 110 to retrieve, request, or access the tags 175 and 180 responsive to processing the website.

In some implementations, the computing device 110 (e.g., via web browser 170) can parse the website data (e.g., HTML or javascript) and cause the tags 175 and 180 to launch. The web browser 170 can launch the tags 175 and 180 simultaneously, substantially simultaneously (e.g., within 1 millisecond), sequentially, or in some other order. In some cases, the web browser 170 (e.g., rendering engine of the web browser) launches or parses and renders the analytics tag 180 prior to launching or parsing the communications tag 175. Launching the analytics tag 180 prior to launching the communications tag 175 may cause the analytics tag 180 to determine that a bucket identifier for the computing session has not been established. For example, the analytics tag 180 can be configured with instructions that access a data file stored in memory of the computing device with session information. The analytics tag 180 can determine that the session information is stale in that certain information is no longer valid; e.g., invalid or old campaign name, location, source, medium, or keyword. The analytics tag 180 may, in some cases, determine that a data file storing session information does not exist in memory of the computing device 110. In some cases, the analytics tag 180 can request session information from data processing system 120. The data processing system 120 may determine that a bucket identifier does not exist for the computing session, and provide an identifier for the computing session.

The analytics tag 180 can create or receive an identifier for the computing session. The analytics tag 180 can create or receive the bucket identifier for the computing session responsive to determining that a bucket identifier for the session has not been established yet. The analytics 180 can create the bucket identifier using one or more of strings, characters, text, numbers, letters, or symbols. For example, the bucket identifier can include a 64 bit or 128 bit identifier. The analytics 180 can instruct the web browser 170 to store the created bucket identifier in a data file in memory of the computing device. The analytics tag 180 can further provide a termination event or expiration condition for the computing session identifier (e.g., time interval, time of day, or geofence).

In some implementations, the web browser 170 (e.g., via rendering engine) can launch the communication tag 175 prior to launching the analytics tag. The communication tag 175 can request an identifier for the computing session from the analytics tag 180. The communication tag 175 can request an identifier for the computing session from the analytics tag 180 responsive to determining that a session identifier is not stored in a corresponding data file in memory of the computing device 110. The communication tag 175 can request the identifier responsive to determining that the analytics engine 180 has not launched yet. The analytics tag 180, responsive to the request from the communication tag 175, can determine that an identifier for the current computing session has not been established yet (e.g., the session identifier value in a data file is undefined) and create a new identifier for the session. For example, the analytics tag 180 can provide session information to the data processing system and the data processing system can determine a bucket identifier based on the received session information. The data processing system can then provide the determined bucket identifier to the analytics tag or communication tag to create the request. In some cases, the data processing system may generate the bucket identifier and then fill in the request with the bucket identifier. In some implementations, the request may not include a bucket identifier; instead, the request may include session information or a session identifier that maps to session information, and the data processing system can determine a bucket identifier based on the session information and use the bucket identifier to allocate a virtual phone number.

In some implementations, the communication tag can create the session identifier. For example, the communication tag 175 can request the identifier from the analytics tag 180, and the analytics tag may indicate, to the communication tag, that an identifier has not been established for the current session. The communication tag 175, responsive to receiving the indication from the analytics tag 180 that the identifier does not exist, can create the identifier itself. For example, the communication tag 175 can be configured to create a bucket identifier using one or more of characters, strings, numbers, letters or symbols. The communication tag 175 can be configured to request the identifier from the data processing system 120. The communication tag 175 can store the created or received identifier for the session in a data file in memory of the computing device.

In some implementations, the data processing system 120 can perform a hybrid allocation technique. In the hybrid allocation technique, the data processing system 120 can determine whether to use a bucket identifier or a session identifier based on a number of active communication channels or a number of available virtual numbers in the pool 155. A session identifier can provide more granularity as it can provide tracking data on a per-session level. However, allocating a unique virtual number to each session, even on a temporary basis, can consume a large amount of resources (e.g., computing resources, memory, require obtaining a large number of virtual numbers). Furthermore, the data processing system 120 (e.g., pool 155) may contain an insufficient number of virtual numbers to allocate a unique virtual number to each active session.

Thus, and in some implementations, the data processing system 120 can use a session identifier if the number of active sessions is less than or equal to a threshold number, and then switch to using a bucket identifier if the number of active sessions is greater than or equal to the threshold number. The data processing system 120 can use a session identifier if the number of available virtual numbers in the pool 155 is greater than or equal to a threshold number, and then switch to using a bucket identifier if the number of available virtual numbers in the pool 155 is less than or equal to the threshold number. This threshold number can be set by an administrator of the data processing system 120, a content provider 125, or a content publisher. The threshold number for active sessions can be, for example, 100, 200, 500, 1000, 2000, 4000, 5000, 10000, or any other threshold number that facilitates allocation of resources. The threshold number for available virtual numbers can be, for example, 10, 20, 50, 100, 200, 500, 1000, or any other threshold number that facilitates allocation of resources.

To facilitate the hybrid allocation technique, in some implementations the data processing system 120 can receive a request that includes both a network activity session identifier and a bucket identifier. For example, the request to allocate the phone number can include a first field having a communication endpoint identifier, a second field having a site identifier for the web site, a third field having a bucket identifier determined by the analytics tag based on the bucketing criteria, and a fourth field having a network activity session identifier for the computing device. The data processing system 120 can determine whether to use the bucket identifier or the network activity session identifier using one or more hybrid allocation techniques. For example, the data processing system 120 can determine a number of active sessions associated with a provider of the website. The data processing system 120 can determine the provider of the website based on the site identifier provided in the request. The site identifier can map to a content publisher 115. For example, the data repository 190 can include a mapping of site identifiers to content publishers 115. The data processing system 120 may further determine a number of active communication channels associated with the content publisher 115. An active communication channel can refer to a pending or live phone call between a computing device 110 and a communication device of the content publisher 115. In some cases, a communication channel may be considered active for a time interval after the phone call is disconnected (e.g., 1 minute, 5 minutes, 10 minutes, 30 minutes, 2 hours). The data processing system 120 may determine the communication to be active for a time interval after the phone call is disconnected because a user may call back using the same virtual number.

The data processing system 120 can determine that the number of active sessions exceeds a threshold (e.g., 1000). The data processing system 120 can determine to use a bucket allocation technique, and create, responsive to the number of active sessions exceeding a threshold, the link between the virtual phone number and the combination of the communication endpoint identifier stored in the first field, the site identifier stored in the second field, and the bucket identifier stored in the third field.

In some cases, the data processing system can determine that the number of active sessions associated with the provider of the website is less than the threshold. The data processing system can determine to use a session identifier to allocate the virtual number. The session identifier can provide increased granularity in tracking data, or per-session tracking for website originated calls. The data processing system can create, responsive to the number of active sessions less than a threshold, a second link between a second virtual phone number and a combination of the communication endpoint identifier stored in the first field, the site identifier stored in the second field, and the network activity session identifier stored in the fourth field; and providing, by the data processing system, the second virtual phone number to the second computing device prior to termination of the second link.

Figure 2:
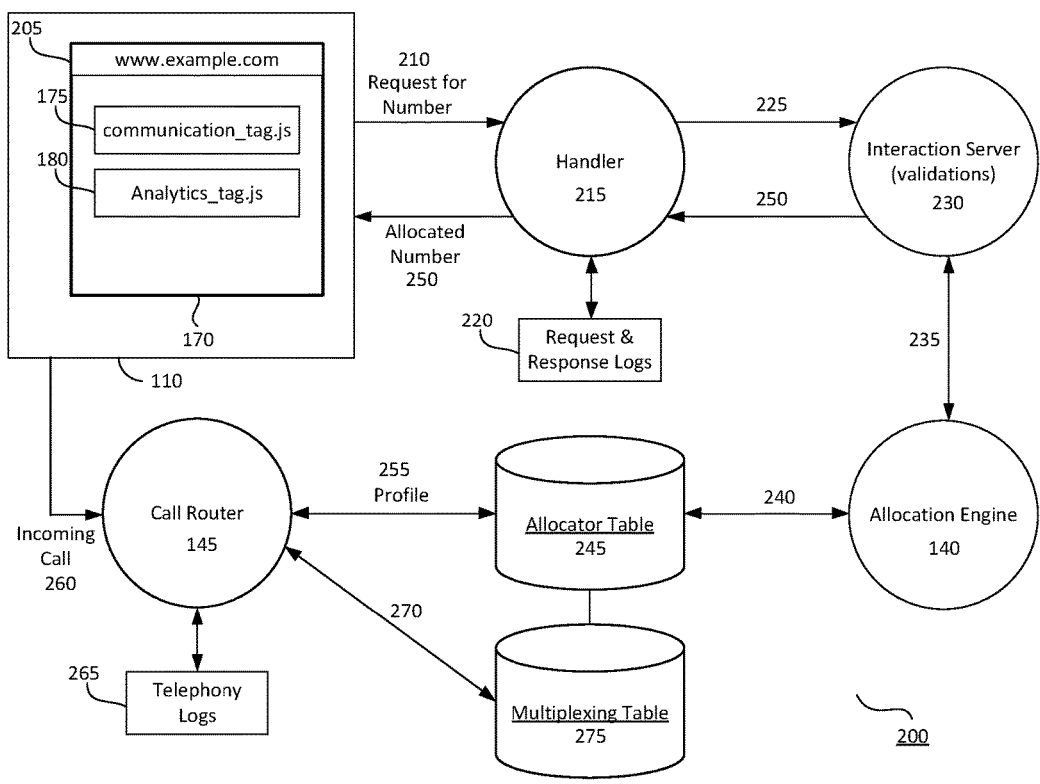
FIG. 2 is an illustration of a functional block diagram of allocating communication resources via information technology infrastructure in accordance with an implementation.

FIG. 2 is an illustration of a functional block diagram 200 of allocating communication resources via information technology infrastructure in accordance with an implementation. The functional block diagram 200 can include or be performed by one or more system or component of system 100, data processing system 120, or 500. The computing device can execute a web browser 170. The web browser 170 can access a website such as www_dot_example_dot_com 205. The web site can include javascript tags, such as communication_tag.js 175 and an analytics_tag.js 180. The web browser 170 can render the website data and the tags 175 and 180. Render one or more of tags 175 and 180 can cause the web browser 170 to generate and transmit a request for an allocated virtual number 210. The web browser can generate the request responsive to user interaction with web site data via browser 170. A handler 215 can receive the request. For example, a data processing system 120 can include or have access to a handler 215. The handler 215 can include one or more server or logic devices configured to receive requests, determine a type of request, and forward the request to facilitate responding to the request. The handler 215 can include a call tracking server. The handler 215 can be further configured to store logs 220 for the request and response. Logs can identify time stamps, types of request, bucket identifier, values for bucketing criteria, website information (e.g., site identifier), or computing device information (e.g., type of device, location). The handler 215 can include a load balancer, interface, intermediary device, network device, appliance, firewall or other device that receives and forwards requests. For example, the handler 215 can parse a field of the request. The request can include a site identifier, communication endpoint identifier, bucket identifier or a session identifier. The handler 215 can perform load balancing based on one or more of the site identifier, communication endpoint identifier, bucket identifier or session identifier.

The handler 215 can forward the request 225 to an interaction server 235 (e.g., via network 105 or other communication technique). The interaction server 235 can include an advertisement interaction server. The data processing system 120 can include or have access to the interaction server 235. The interaction server 230 can be configured to perform a validation process or technique. The interaction server 230 can be configured to validate the request. The interaction server 230 can validate one or more aspects of the request. The interaction server 230 can analyze the request to determine that the request is not a malicious request, does not include or trigger a virus, threat, or other network attack. The interaction server 230 can be configured with a virus detector or threat engine that analyzes the source of the request (e.g., IP address, location, computing device information, routing path of request), number of requests from the source, or parameters of the request and compares the request information with historical request information, such as known threat signatures. The interaction server 230 can validate the request based on the site identifier of the request, communication endpoint of the request, bucket identifier, bucketing criteria values, or session identifier of the request. For example, the interaction server 230 can determine that the site identifier of the request corresponds to a known malicious website or compromised website. The interaction server 230 can, responsive to determining that the site has been compromised, terminate the request. In another example, the interaction server 230 can determine that multiple requests received from different computing devices within a time interval contain the same session identifier or bucket identifier. The interaction server 230 can determine that the number of requests with the same session identifier or bucket identifier within a predetermined time interval exceeds a predetermined threshold (e.g., 10 requests in 1 minute; 100 requests in 10 minutes; 1000 requests in 30 minutes), classify the request as fraudulent, and terminate the request.

If the interaction server 230 determines that the request is fraudulent, malicious, or otherwise invalid, the interaction server 230 can terminate the request and block or not forward the request to the allocation engine 140. Thus, the interaction server 230 can protect the allocation engine 140 and further systems (e.g., one or more portion of data processing system 120) from being infected by a virus. The interaction server 230 can further facilitate resource allocation by minimizing the processor and memory consumption of downstream components of the data processing system 120. The interaction server 230 can also prevent depletion of available virtual number in the pool 155 by preventing the allocation engine 140 from allocating virtual phone numbers to false, malicious, or fraudulent requests.

Upon validating the request, the interaction server 230 can forward the request to the allocation engine 140 of the data processing system 120 (e.g., via network 105 or other communication technique). The allocation engine 140 can parse the request to identify the site identifier, session identifier, and communication endpoint. Using the values of these fields of the request, the allocation engine 140 can perform a lookup 240 in the allocator table 245 to identify an available virtual number to assign to the combination of one or more of the site identifier, bucket identifier, session identifier, and communication endpoint. The allocator table 245 can include or correspond to the pool 155.

Responsive to assigning the virtual phone number to the combination, the allocation engine 140 can provide the assigned virtual phone number respond to the request received from the interaction server 230 with the assigned virtual phone number. The interaction server 230 can respond to the request 250 received from handler 215, and the handler 215 can respond to the request 250 received from the web browser 170 with the allocated number 250. The handler 215 can further store a log of the response 220 with the assigned virtual number.

The response provided to the web browser 170 of computing device 110 can cause the computing device 110 to launch a call application to initiate a communication channel corresponding to the assigned virtual number. In some cases, the computing device 110 can display a pop-up window with a button. A user of the computing device can select the button to initiate the call. The call router 145 can receive the incoming call 260 from the computing device 110. The call router 145 can determine that the incoming call 260 corresponds to the assigned virtual number. For example, the call router 145 can access 270 a multiplexing table 275 to determine that the assigned virtual number maps to a corresponding communication endpoint, site identifier, and bucket identifier (or session identifier). This information can be stored in the allocator table 245 or the multiplexing table. For example, the multiplexing table may include an index that allows for efficient searching of information stored in the allocator table 245. The data processing system 120 can further determine a profile 255 for the assigned virtual number of the incoming call 260. The profile can include the site identifier, bucket identifier (or session identifier), or communication endpoint that is linked to the assigned virtual number. Thus, the data processing system 120 can attribute the incoming call 260 to the profile information, and provide this information for storage in telephony logs 265.

FIG. 3 is an illustration of a graphical user interface 300 with data objects generated based on executed tags interacting with a data processing system 120 to allocate communication resources via information technology infrastructure in accordance with an implementation. The user interface 300 may include an online document page displayed by an application executing on a computing device 110, such as a web page 305 rendered by a web browser. The web page may be an interface for a search engine, and include a search query input box. The web page may be a news web page or other content web page including main content 325. The data processing system (e.g., via content selector) can further provide a content item 315, such as an advertisement for a taxi service. The content item 315 may include a sponsored link included by the data processing system 120. The content item 315 may include a link or button to click for a phone number 320, as well as a web address to a target or landing web page. The user may click the phone link 320, which may cause one or more tags of the website to interact with each other to generate a request for an allocated virtual number. The request can include a site identifier, communication endpoint identifier, a bucket identifier or a session identifier. The computing device 110 can transmit the request to the data processing system 120. The data processing system can, responsive to receiving the request, provide the virtual phone number 330. The virtual phone number 330 can be provided via a pop up window, replace the link 320, be displayed adjacent to the content item, and be sent to the user device via a notification, alert, SMS text message or email. The data processing system 120 providing the virtual number 330 to the computing device 110 can cause a call application of the computing device to initiate a communication channel corresponding to the assigned virtual number.

Still referring to FIG. 3, the example user interface 300 provides a content item 315 with a virtual number 320, in accordance with some implementations. The user interface can include a search engine user interface 305, search engine results page 305, or main content web page. In cases where the webpage includes a search engine 305, the search engine 305 can include an input text box in which a user may enter a search query, such as taxi. The search engine 305 can provide search results 325 (e.g., search results 1, etc.). The data processing system 120 (e.g., via content selector) can select content items responsive to the search query, and provide them for display alongside the search results in response to the search query. The data processing system can establish, generate or otherwise identify a unique content impression identifier for the content item impression. A content item impression can refer to a presentation of the content item via a computing device. A content item impression can refer to displaying the content item, playing the content item, transmitting the content item to the computing device, or selecting the content item to provide to the computing device. In some cases, the data processing system 120 can generate the content impression identifier responsive to interaction with the content item, such as responsive to a click or selection of the content item. The content item impression identifier can include or be based on one or more parameters or fields, such as a process identifiers or IP address identifiers associated with the content item or content item impression. In this example, the advertisement 315 may be for a taxi service provider. The taxi service provider may have setup an advertisement campaign or advertisement group that includes content selection criteria that includes the term "taxi". The advertisement may include a web link 335 to the taxi provider's website. The advertisement 315 may further include a link 320 to access a virtual number. A user may select the link 320 can cause the tags embedded and rendered on the webpage 305 to generate a request for a phone number. Responsive to receiving the request, the data processing system 210 (e.g., via allocation engine 140) may provide a virtual phone number 330. The virtual phone number 330 may be displayed via a pop-up window, by replacing the text 320, by directing the user to another website. In some cases, selecting the link 320 may cause the user's device to call the virtual phone number. For example, the data processing system 120 may receive the selection, provide the virtual phone number to the user's device, and instruct the user's device to further call the virtual phone number.

When the data processing system 120 receives the request for the virtual number, the data processing system can access a database storing available virtual numbers to map or assigned to a combination of values of fields in the request. In some implementations, the database may dynamically assign virtual phone numbers, and then store, in the database, a mapping of the dynamically generated/assigned virtual phone number to the combination, content provider, content campaign, content group, or content item.

Figure 4:
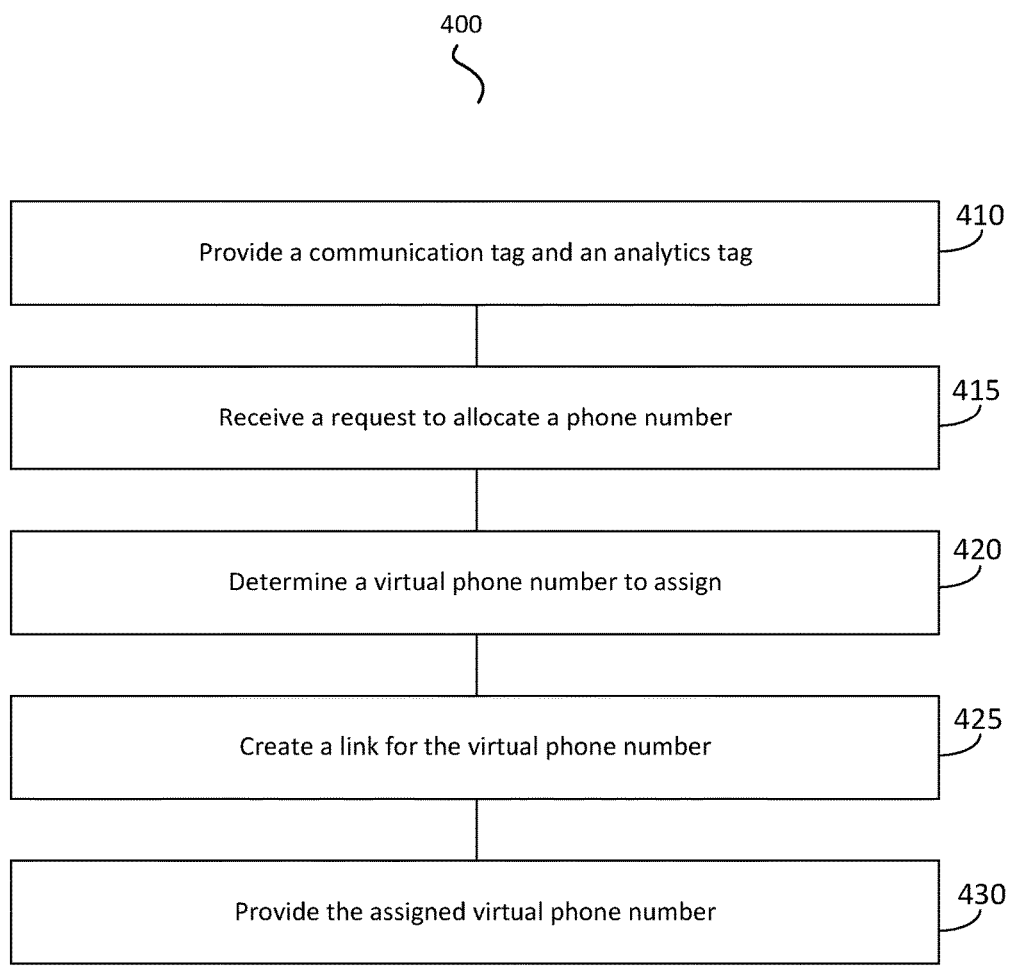
FIG. 4 is an illustration of a method of allocating communication resources via information technology infrastructure in accordance with an implementation.

FIG. 4 is an illustration of a method of allocating communication resources via information technology infrastructure in accordance with an implementation. The method 400 can be performed via one or more system, component or interface illustrated in FIG. 1, FIG. 2, FIG. 3 or FIG. 5, including, e.g., a data processing system, allocation engine, tag server, content selector, call router, handler, interaction server, or data repository. In brief overview, and in some implementations, the method 300 includes a data processing system providing a communication tag and an analytics tag at 410. At 415, the data processing system receives a request to allocate a phone number from a computing device. At 420, the data processing system determines a virtual phone number to assign based on the request. At 425, the data processing system creates a link for the virtual phone number 425. At 430, the data processing system provides the assigned virtual phone number to the computing device responsive to the request.

Still referring to FIG. 4, and in further detail, a data processing system provides a communication tag and an analytics tag at 410. The data processing system can provide the tags for integration in a website. The data processing system can provide the tags prior to rendering of the website. The data processing system can provide the tags to a website publisher prior to a computing device requesting access or data from the website. The data processing system can provide the tags in the form of links or pointers to external data files containing the tag scripts. The data processing system can provide the tag scripts or pointers to the website publisher so the website publisher can integrate or embed the tag scripts into the website. The tag scripts can be integrated or embedded in the website such that a web browser of the computing device accessing the website can render and execute the HTML content and the embedded tags.

The data processing system can configure the communication tag with fields such as a communication endpoint identifier and a site identifier for the website. The data processing system can preconfigure the communication tag with the communication endpoint identifier and the site identifier. The data processing system can receive instructions from a content provider or a content publisher to configure the communication tag with one or more fields. The data processing system can further configure the analytics tag to determine a bucket identifier or a session identifier of a network activity session of a computing device. For example, the data processing system can configure the analytics tag to determine network activity information of the session and determine values for bucketing criteria. The analytics tag can generate a bucket identifier using one or more values for the bucket criteria. The analytics tag, computing device or data processing system can determine the values for the bucketing criteria based on information about the network activity session, such as a source or network channel that directed the computing device to the web site, a medium via which the computing device accessed the website, a campaign identifier, a search query keyword, a location, or a time stamp. For example, a bucketing criteria can be "source" and a value can be "Search_Engine_Provider_A"

In some cases, the data processing system can configure the analytics tag to determine a session identifier. For example, the data processing system can determine whether a session identifier for the network activity session has been established and stored in a data file of the computing device. If the network activity session identifier is undefined, the analytics tag can be configured to either create a network activity session identifier, or request a network activity session identifier from the data processing system.

The analytics tag or data processing system can create the bucket identifier or network activity session identifier using characters, strings, numbers, letter or symbols. The identifiers can be created using a hash function applied to one or more of a bucketing criteria values, time stamp, computing device identifier, or site identifier. The hash function can output a hash value. The hash value can be used as the bucket identifier or the session identifier.

At 415, the data processing system receives a request to allocate a phone number from a computing device. The tags rendered or executed on the webpage by the web browser of the communication device can generate the request. The computing device can transmit the request to the data processing system via a network. The request can include a communication endpoint identifier, site identifier, a bucket identifier or a session identifier. For example, the communication tag can be preconfigured with the site identifier and the communication endpoint identifier. The analytics to can be configured to determine the bucket identifier or the session identifier. The communication tag can interact with the analytics tag to determine the bucket identifier or the session identifier. Using the bucket identifier or the session identifier, the communication tag can generate a request with values for the communication endpoint identifier, site identifier, the bucket identifier or the session identifier.

In some implementations, the communication tag and the analytics tag can be launched at the same time (or substantially the same time), sequentially, or at different times. The tags can be launched during the rendering of the website. The tags can be launched after the website has been rendered. For example, the tags can be launched responsive to interaction with the website (e.g., a user selecting a button the website that causes one or more tags to fire). Launching a tag can refer to rendering, executing, triggering or firing of a tag. The launch timing can be controlled by the website publisher, data processing system, or may be random. The web browser of the computing device can launch the analytics tag prior to launching the communication tag. The analytics tag can determine than an identifier for the session has not been established yet. The analytics tag, responsive to determining that an identifier for the session has not been established, can create the identifier for the session. The analytics tag can store the created identifier for the session in a data file in memory of the computing device. The analytics tag can retrieve the identifier (e.g., bucket identifier or session identifier) for the session stored in the data file responsive to the request from the communication tag, and provide the retrieved identifier of the session to the communication tag.

In some cases, the web browser launches the communication tag prior to launching the analytics tag. The communication tag can request an identifier (e.g., bucket identifier or session identifier) of the session from the analytics tag. However, since the communication tag launched first, the analytics tag may not have established an identifier for the session yet. Thus, the analytics tag can respond to the request for the identifier with an indication that the identifier for the session has not been established or is undefined. The communication tag, in response to receiving the indication from the analytics tag indicating that an identifier for the session has not been established, can determine an identifier for the session. For example, the communication tag can be configured to create the identifier for the session, can request the data processing system to provide an identifier for the session, or can instruct the analytics tag to create the identifier for the session. The communication tag can store the determined identifier for the session in a data file in memory of the computing device.

In some implementations, the analytics tag can receive a second request from the communication tag. The second request can be for a second identifier. The second request can be for an identifier of a second session different from the first session or previous session. The second session may be a current session and the first session can be a previous session or historical session that has terminated or expired due to a termination event. The network activity information for the second session may correspond to different bucketing criteria values, resulting in a different bucket identifier.

The analytics tag can determine that the second session is different from the first session using one or more techniques. For example, the analytic tag can determine that a previous session has expired based on a termination event such as a session break. A session break can be based on an expiration of a predetermined interval (e.g., 30 minutes). The termination event can be based on a change in context of web site data accessed by the computing device. For example, accessing sports news can be a different context than accessing an online retailer website to purchase a mobile phone. The change in context can refer to different advertising campaigns directing the computing device to the web site. For example, the computing device may access the same website in the first session and the second session within the predetermined time interval. The user may access the website during the first session by entering keywords in a search engine that triggered a first advertisement campaign containing a first advertisement with a link to the website. However, the user may access the same website during the second session by entering different keywords in a search engine that trigger a second advertisement campaign different from the first advertisement campaign containing a second advertisement different from the first advertisement. The second advertisement may also contain a link to the same website. Because the computing device is directed to the same website via two different advertisement campaigns, the data processing system or analytics tag can determine that the second visit to the website corresponds to a different session and initiate a second session, even though the second visit occurred during the predetermined time interval. Thus, the data processing system may receive a request for the second session that includes a different bucket identifier as compared to a bucket identifier included in a request received for the first session.

The analytics engine can identify initiation of a second session subsequent to termination of a previous session or based on a change in context or triggering of a termination condition. The analytics tag or data processing system can generate a second identifier for the second session. In some cases, the data processing system or analytics tag can instruct the computing device to remove or delete, from memory of computing device, the identifier of the first session (e.g., previous session or expired session) responsive to a termination event. The identifier can be removed by deleting the data file containing the identifier, or placing a null value or default value in the data file.

At 420, the data processing system determines a virtual phone number to assign based on the request. The data processing system can access a pool of available virtual phone numbers to determine an available virtual phone number. The data processing system can assign the available virtual phone number to the combination of the first field, second field, and third field in the request. At 425, the data processing system creates a link between the combination of the fields and the virtual phone number, and can store the link in a database. By assigning the virtual phone number to the combination of fields in the request, such as the communication endpoint, site identifier, and session identifier, the data processing system can reuse the same virtual phone number responsive to a second request that includes that same site identifier, communication endpoint, and session identifier.

In some cases, the tags can generate a second request for the first session. The second request can be for the same website or site identifier, include the same communication endpoint, and the same bucket identifier. Thus, the data processing system may provide, responsive to the second request matching a previous request, a previously assigned virtual phone number.

At 430, the data processing system provides the assigned virtual phone number to the computing device responsive to the request. The data processing system can provide the assigned virtual phone number for display on a display device of the computing device. In some cases, the data processing system can provide the phone number and cause the computing device to launch a call application to initiate a communication channel corresponding to the allocated virtual phone number. The data processing system can receive the call and identify a communication endpoint mapped to the virtual number. The data processing system can further determine the bucket identifier and site identifier mapped to the virtual number. The data processing system can store, in a telephone log, the incoming phone call, time stamp, site identifier, bucket identifier or other information associated with the computing device. The data processing system can further forward, bridge, route or otherwise direct the call to establish a communication channel between the computing device and a device corresponding to the communication endpoint identifier. The device corresponding to the communication endpoint identifier can include, e.g., a device of a content provider, customer service center, or call agent.

Figure 5:
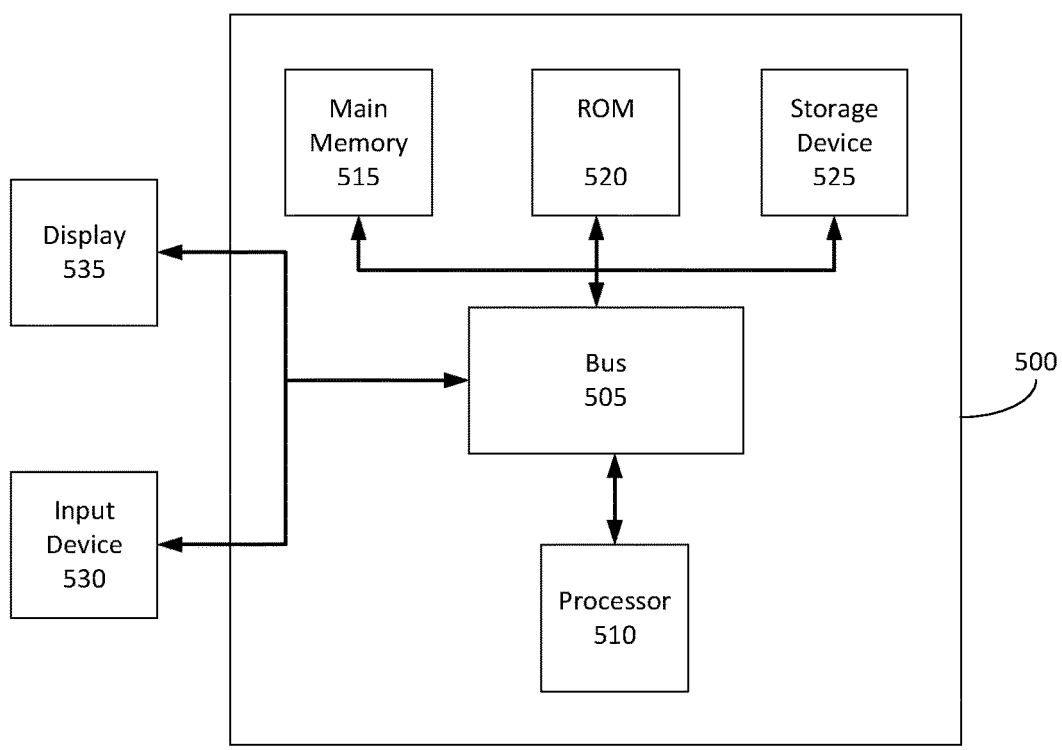
FIG. 5 is a block diagram illustrating a general architecture for a computer system that may be employed to implement various elements of the systems shown in FIGS. 1 and 2, the interface shown in FIG. 3, and the method shown in FIG. 4, in accordance with an implementation.

FIG. 5 is a block diagram of a computer system 500 in accordance with an illustrative implementation. The computer system or computing device 500 can be used to implement the system 100, content provider 125, computing device 110, content publisher 115, data processing system 120, content selector 130, tag server 135, allocation engine 140, call router 145, or data repository 190. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to allocate communication resources via information technology infrastructure, comprising:
  a memory having instructions stored thereon; and
  one or more processors configured to, in response to executing the instructions:
    receive, responsive to a triggering event associated with a webpage accessed by a computing device, a request to allocate a virtual phone number, the request associated with a communication endpoint identifier, a site identifier associated with the webpage or a web site comprising the webpage, and a bucket identifier determined based on bucketing criteria associated with the web site;
    identify a number of active sessions corresponding to the web site;
    determine that the number of active sessions is greater than or equal to a threshold;

switch from using session identifiers to bucket identifiers responsive to the determination that the number of active sessions is greater than or equal to the threshold;

determine, responsive to the switch, to assign a virtual phone number to a combination of the communication endpoint identifier, the site identifier, and the bucket identifier associated with the request;

identify, in a map data structure, a link between the virtual phone number and the combination of the communication endpoint identifier, the site identifier, and the bucket identifier associated with the request; and provide the assigned virtual phone number to the computing device prior to termination of the link.

2. The system of claim 1, wherein the one or more processors are further configured to:

identify the bucketing criteria including at least one of a source that directed the computing device to the web site, a medium via which the computing device accessed the web site, a campaign identifier, a search query keyword, or a location; and establish the bucket identifier based on the bucketing criteria.

3. The system of claim 1, wherein the one or more processors are further configured to:

manage a data structure in the memory comprising a plurality of available virtual numbers; and select, from the data structure, the virtual phone number from the plurality of available virtual numbers.

4. The system of claim 1, wherein the one or more processors are further configured to:

create, in the map data structure, the link between the virtual phone number and the combination of the communication endpoint identifier, the site identifier, and the bucket identifier associated with the request.

5. The system of claim 1, wherein the one or more processors are further configured to:

set an expiration for the link in the map data structure between the virtual phone number and the combination of the communication endpoint identifier, the site identifier, and the bucket identifier associated with the request.

6. The system of claim 1, wherein the one or more processors are further configured to:

terminate, responsive to a termination event, the link in the map data structure between the virtual phone number and the combination of the communication endpoint identifier, the site identifier, and the bucket identifier associated with the request.

7. The system of claim 1, wherein the one or more processors are further configured to:

provide one or more tags for integration on the web site, the one or more tags configured to provide at least one of the communication endpoint identifier, the site identifier, the bucketing identifier or the bucketing criteria.

8. The system of claim 1, wherein the one or more processors are further configured to:

initiate, via the virtual phone number, a communication channel between the computing device and the data processing system.

9. The system of claim 1, wherein the one or more processors are further configured to:

connect the computing device with the communication endpoint identifier mapped to the virtual phone number to establish a communication channel between the computing device and a device corresponding to the communication endpoint identifier.

10. The system of claim 1, wherein the one or more processors are further configured to:

return, responsive to a termination event, the virtual phone number to a data structure in the memory comprising a plurality of available virtual number.

11. A method allocating communication resources via information technology infrastructure, comprising:

receiving, by a data processing system comprising one or more processors and memory, responsive to a triggering event associated with a webpage accessed by a computing device, a request to allocate a virtual phone number, the request associated with a communication endpoint identifier, a site identifier associated with the webpage or a web site comprising the webpage, and a bucket identifier determined based on bucketing criteria associated with the web site;

identifying, by the data processing system, a number of active sessions corresponding to the web site;

determining, by the data processing system, that the number of active sessions is greater than or equal to a threshold;

switching, by the data processing system, from using session identifiers to bucket identifiers responsive to the determination that the number of active sessions is greater than or equal to the threshold;

determining, by the data processing system responsive to the switch, to assign a virtual phone number to a combination of the communication endpoint identifier, the site identifier, and the bucket identifier associated with the request;

identifying, by the data processing system in a map data structure, a link between the virtual phone number and the combination of the communication endpoint identifier, the site identifier, and the bucket identifier associated with the request; and providing, by the data processing system, the assigned virtual phone number to the computing device prior to termination of the link.

12. The method of claim 11, comprising:

identifying, by the data processing system, the bucketing criteria including at least one of a source that directed the computing device to the web site, a medium via which the computing device accessed the web site, a campaign identifier, a search query keyword, or a location; and establishing, by the data processing system, the bucket identifier based on the bucketing criteria.

13. The method of claim 11, comprising:

managing, by the data processing system, a data structure in the memory comprising a plurality of available virtual numbers; and selecting, by the data processing system from the data structure, the virtual phone number from the plurality of available virtual numbers.

14. The method of claim 11, comprising:

creating, by the data processing system in the map data structure, the link between the virtual phone number and the combination of the communication endpoint identifier, the site identifier, and the bucket identifier associated with the request.

15. The method of claim 11, comprising:

setting, by the data processing system, an expiration for the link in the map data structure between the virtual phone number and the combination of the communication endpoint identifier, the site identifier, and the bucket identifier associated with the request.

16. The method of claim 11, comprising:

terminate, responsive to a termination event, the link in the map data structure between the virtual phone number and the combination of the communication endpoint identifier, the site identifier, and the bucket identifier associated with the request.

17. The method of claim 11, comprising:

providing, by the data processing system, one or more tags for integration on the web site, the one or more tags configured to provide at least one of the communication endpoint identifier, the site identifier, the bucketing identifier or the bucketing criteria.

18. The method of claim 11, comprising:

initiating, by the data processing system via the virtual phone number, a communication channel between the computing device and the data processing system.

19. The method of claim 11, comprising:

connecting, by the data processing system, the computing device with the communication endpoint identifier mapped to the virtual phone number to establish a communication channel between the computing device and a device corresponding to the communication endpoint identifier.

20. The method of claim 11, comprising:

returning, by the data processing system, responsive to a termination event, the virtual phone number to a data structure in the memory comprising a plurality of available virtual number.

* * * * *